(12) United States Patent
Detrembleur et al.

(10) Patent No.: US 12,503,552 B2
(45) Date of Patent: Dec. 23, 2025

(54) SELF-BLOWING ISOCYANATE-FREE POLYURETHANE FOAMS

(71) Applicant: Université de Liège, Liège (BE)

(72) Inventors: Christophe Detrembleur, Liège (BE); Jean-Michel Thomassin, Liège (BE); Bruno Grignard, Liège (BE); Florent Monie, Liège (BE); Christine Jerome, Liège (BE)

(73) Assignee: Universite de Liege, Liege (BE)

( * ) Notice: Subject to any disclaimer, the term of this patent is extended or adjusted under 35 U.S.C. 154(b) by 901 days.

(21) Appl. No.: 17/567,420

(22) Filed: Jan. 3, 2022

(65) Prior Publication Data
US 2022/0195117 A1 Jun. 23, 2022

Related U.S. Application Data

(63) Continuation-in-part of application No. PCT/EP2020/068962, filed on Jul. 6, 2020.

(30) Foreign Application Priority Data

Jul. 5, 2019 (EP) .................................... 19184743

(51) Int. Cl.
C08G 71/04 (2006.01)
C08G 101/00 (2006.01)
C08J 9/08 (2006.01)

(52) U.S. Cl.
CPC ................ C08G 71/04 (2013.01); C08J 9/08 (2013.01); C08G 2101/00 (2013.01)

(58) Field of Classification Search
CPC ......... C08G 71/04; C08G 2101/00; C08J 9/08
See application file for complete search history.

(56) References Cited

U.S. PATENT DOCUMENTS

2012/0149842 A1* 6/2012 Diakoumakos ........ C08G 71/04
977/773
2014/0182784 A1 7/2014 Luebke et al.

FOREIGN PATENT DOCUMENTS

EP 3199569 A1 2/2017
WO WO-9640813 A1 * 12/1996 ............. C08G 18/12

OTHER PUBLICATIONS

Blattmann, Hannes, Marc Lauth, and Rolf Mülhaupt. "Flexible and Bio-Based Nonisocyanate Polyurethane (NIPU) Foams." Macromolecular Materials and Engineering 301.8 (2016): 944-952. XP002796075, WPI/2017 Clarivate Analytics.

* cited by examiner

Primary Examiner — Joseph S Del Sole
Assistant Examiner — Andrea Wu
(74) Attorney, Agent, or Firm — Hoffmann & Baron, LLP

(57) ABSTRACT

The present invention relates to a curable isocyanate-free formulation for preparing a polyurethane self-blowing foam comprising at least one multifunctional cyclic carbonate having at least two cyclic carbonate groups at the end of the chain (compound A), at least one multifunctional amine (compound B), at least one multifunctional thiol (compound C) and at least one catalyst (compound D), to a process for preparing said foams, to the thus obtained foams and the recycling of said foams.

25 Claims, 6 Drawing Sheets $^1$H NMR spectrum of the crude product formed after 120 minutes by the DBU (compound D) catalyzed aminolysis of propylene carbonate (compound E) with 2,2'-(ethylenedioxy)-bis-ethylamine (compound B)

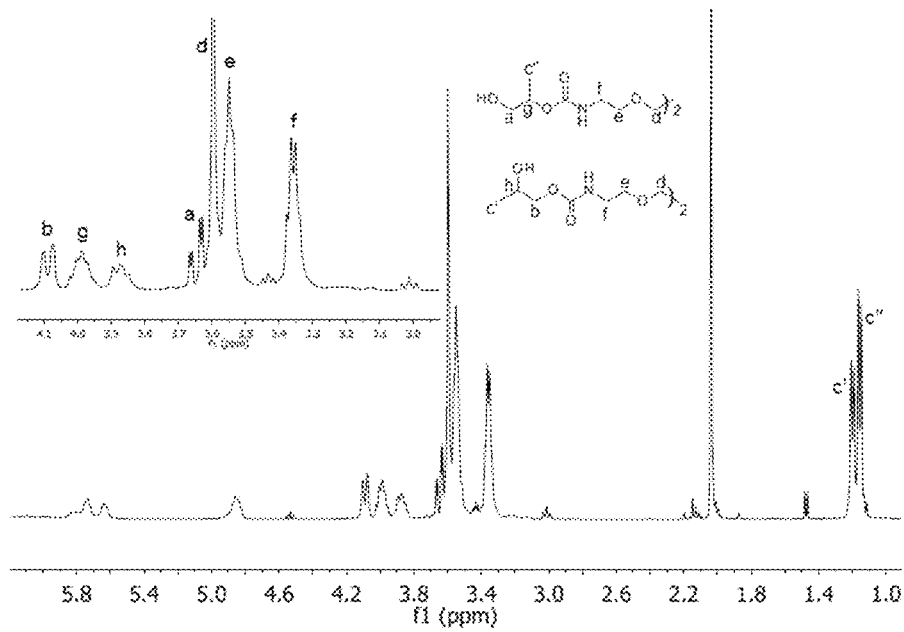

Figure 1: ¹H NMR spectrum of the crude product formed after 120 minutes by the DBU (compound D) catalyzed aminolysis of propylene carbonate (compound E) with 2,2'-(ethylenedioxy)-bis-ethylamine (compound B)

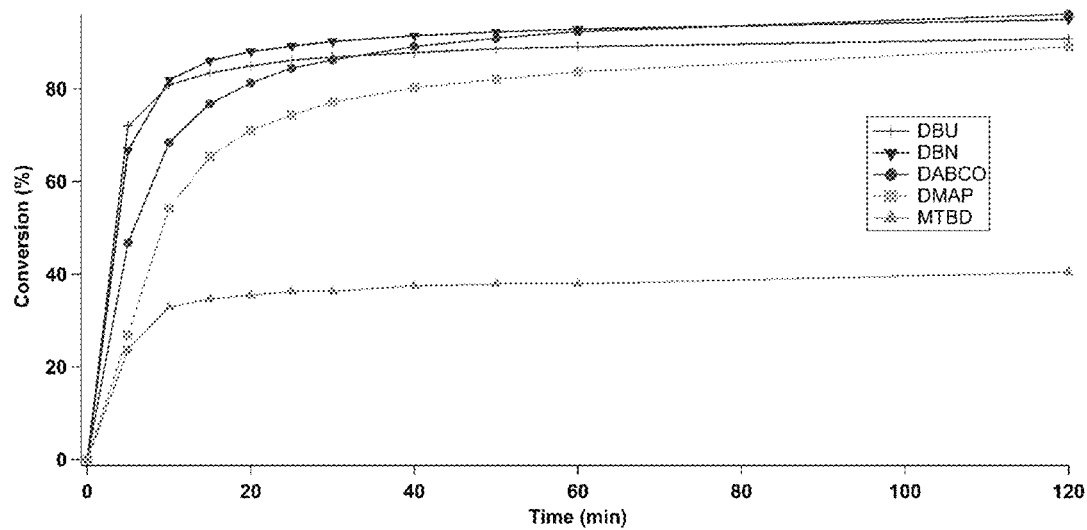

Figure 2: Time evolution of the propylene carbonate (compound E) aminolysis under solvent-free conditions at 80°C. Comparison of the catalytic activity of various compounds D

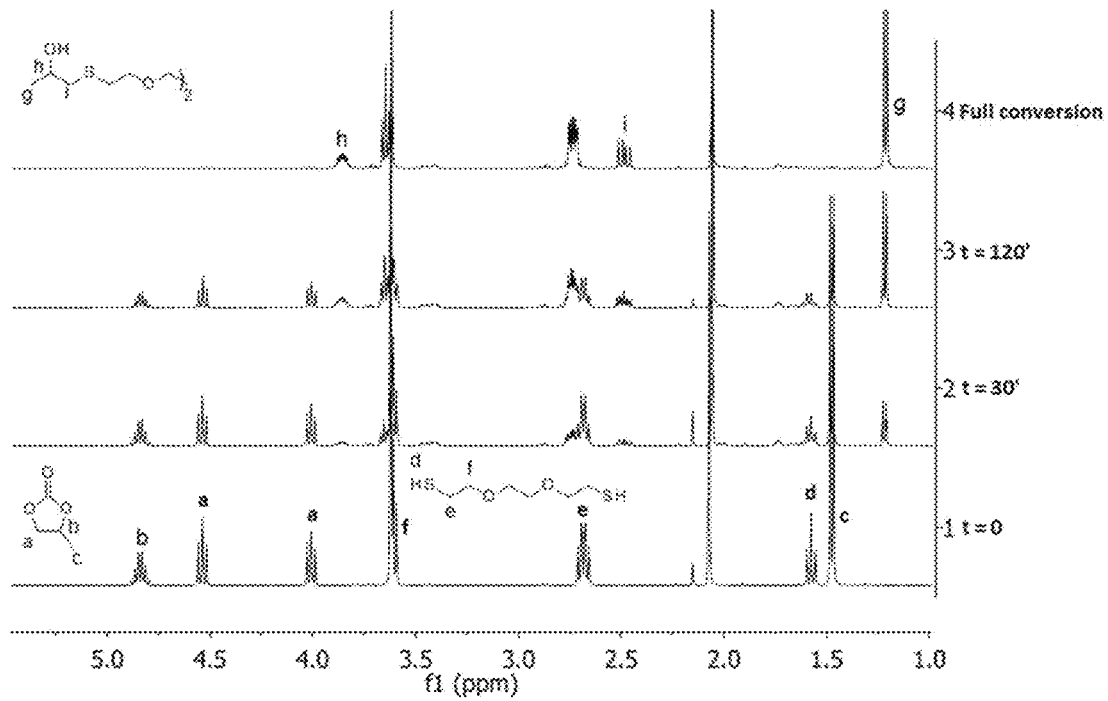

Figure 3: Time evolution of the decarboxylative alkylation of 2,2'-(ethylenedioxy)diethanethiol (compound C) with propylene carbonate (compound E) promoted by DBU (compound D) under solvent-free conditions at 80°C.

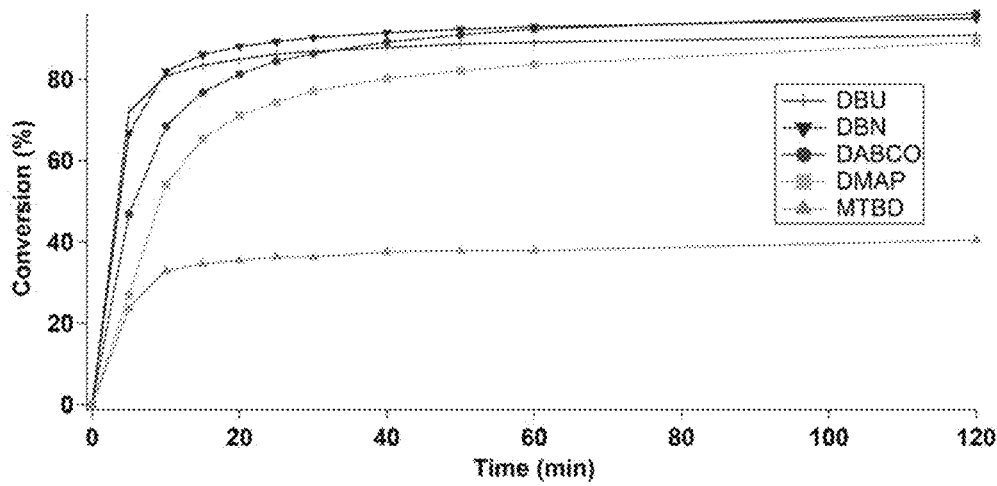

Figure 4: Time evolution of the propylene carbonate (compound E) conversion for the solvent-free decarboxylative alkylation of 2,2'-(ethylenedioxy)diethanethiol (compound C) at 80°C. Benchmarking of the catalytic activity of various compounds D.

A : DBU catalyst (compound D)
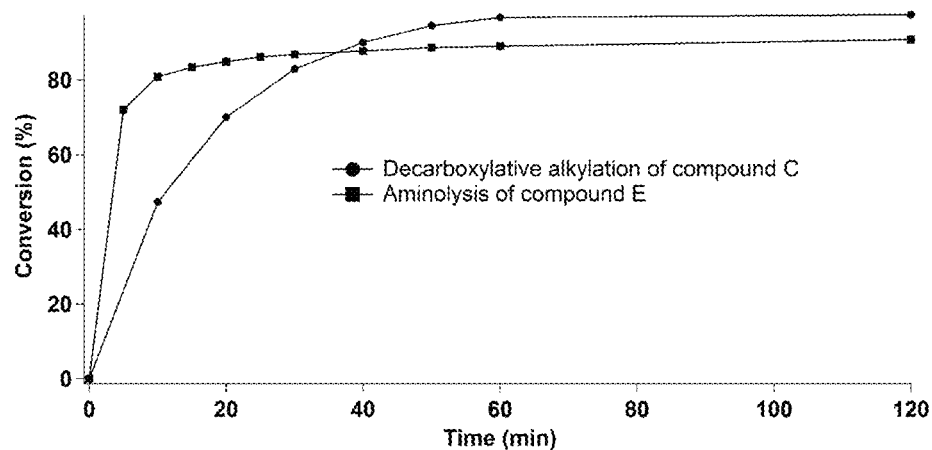
B : DMAP catalyst (compound D
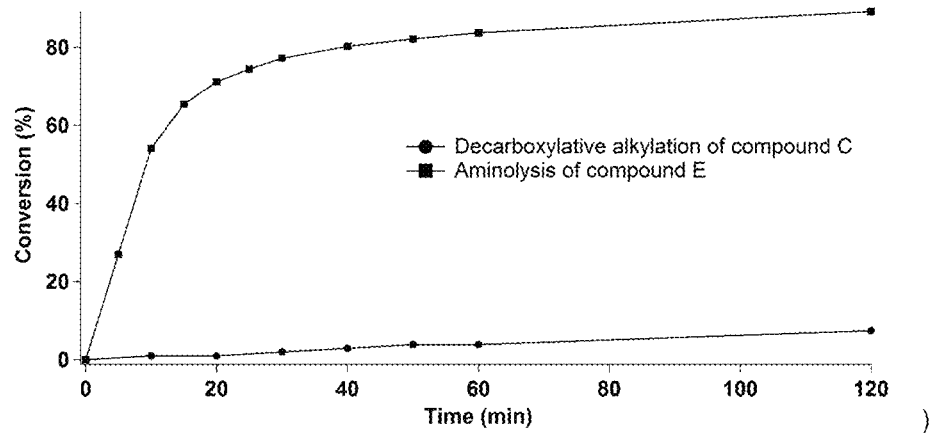
Figure 5: Comparative kinetics studies of the decarboxylative alkylation of 2,2'-(ethylenedioxy)diethanethiol (compound C) and aminolysis reaction (with compound B) of propylene carbonate (compound E) promoted by compound D (figure A: DBU catalyst, Figure B: DMAP catalyst) under solvent-free conditions at 80°C.

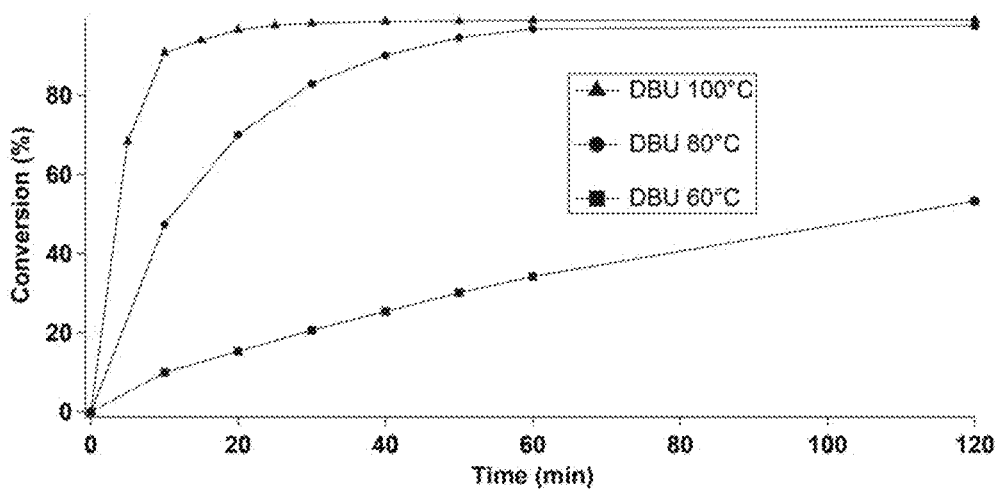
Figure 6: Influence of the temperature on the DBU (compound D)-driven decarboxylative alkylation of 2,2'-(ethylenedioxy)diethanethiol (compound C) with propylene carbonate (compound E) under solvent free conditions
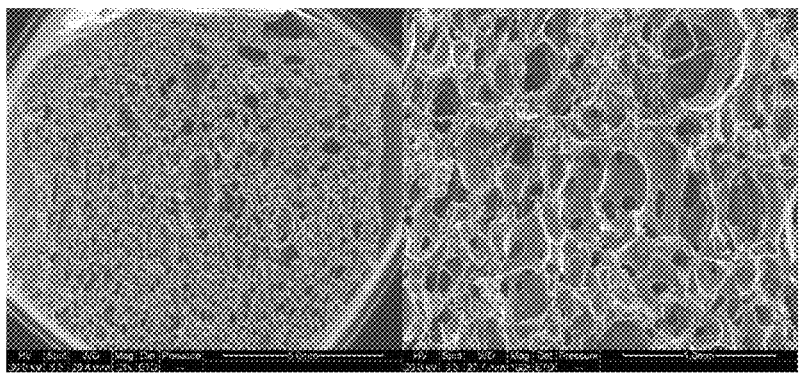
Figure 7: SEM characterization of the foams of example 4
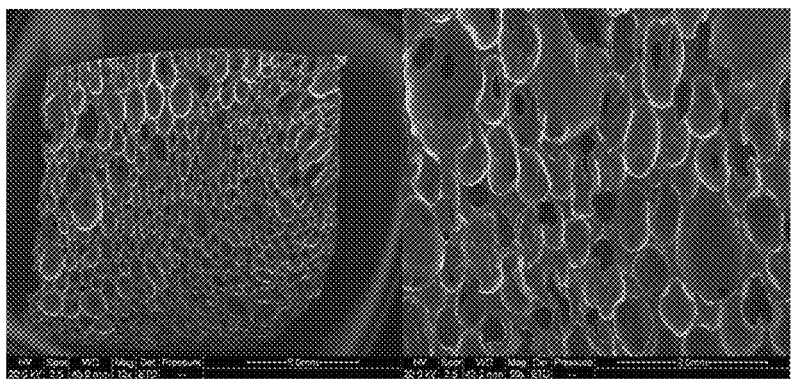
Figure 8: SEM characterization of the foams of Example 5

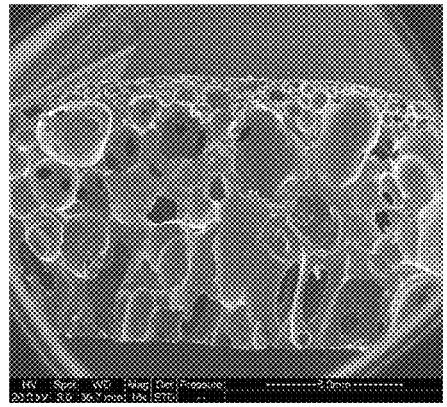
Figure 9: SEM characterization of the foams of Example 6
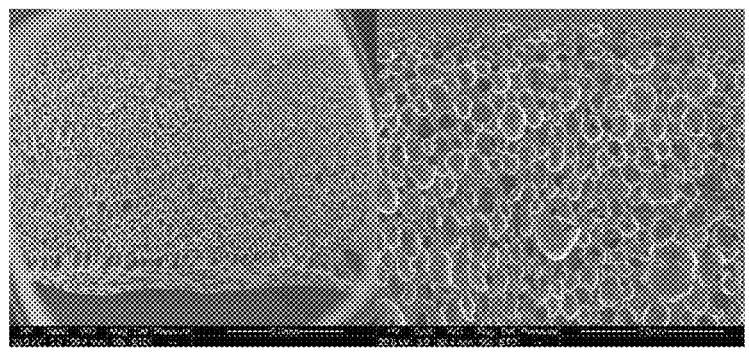
Figure 10: SEM characterization of the foams of Example 8
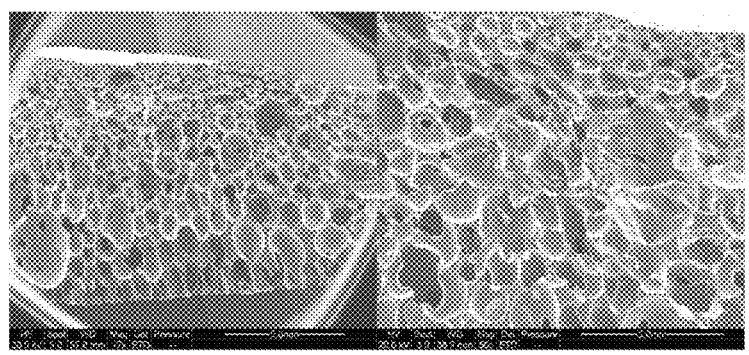
Figure 11: SEM characterization of the foams of Example 9

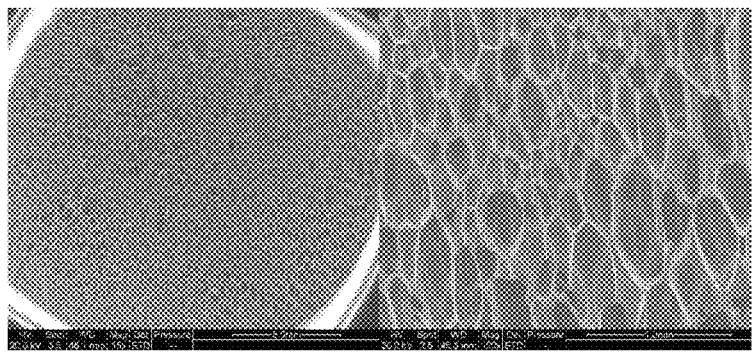
Figure 12: SEM characterization of the foams of Example 10

SELF-BLOWING ISOCYANATE-FREE POLYURETHANE FOAMS

CROSS REFERENCE TO RELATED APPLICATIONS

This application is a continuation-in-part of International Application No. PCT/EP2020/068962, filed on Jul. 6, 2020, which claims priority from European Patent Office application number EP 19184743.3, filed on Jul. 5, 2019, each of which is incorporated herein in its entirety.

TECHNICAL FIELD OF THE INVENTION

The present invention relates to a method for producing self-blowing isocyanate-free polyurethanes foams from reactive curable isocyanate-free polyurethane formulations, the products formed thereof and the formulations for use in said process. The invention also relates to the process for recycling said foams and the products formed thereof.

BACKGROUND OF THE INVENTION

Polyurethanes (PUs) are employed in a wide range of applications, notably in the form of foams. Depending on their composition, polyurethane foams can vary in structure from soft flexible foams to rigid foams used in insulation or structural materials. Flexible or rigid polyurethane foams are key players for designing materials for wellness, furniture, mattresses, shock absorption, thermal/acoustic insulation or sealants.

Industrially, polyurethane foams are most often obtained by polymerization between a polyisocyanate and a hydroxyl terminated oligomer (polyol). Their foaming is generally induced by the in-situ generation of carbon dioxide ($CO_2$) upon addition of water within the reactive formulation (see reaction scheme below). The water provokes the hydrolysis of the isocyanate into $CO_2$ acting as a blowing agent and an amine that is incorporated into the growing PU chains.

Reaction Scheme: conventional production of PU foams from isocyanate-based chemistry

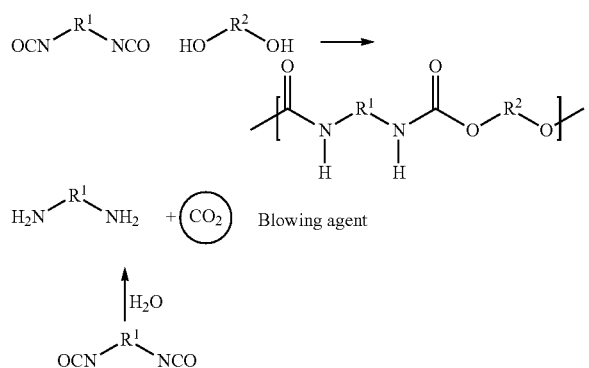

Instead of water, other blowing agents may be used to perform expansion and foaming of the polymeric matrix. The blowing agent may be either produced in situ as a reaction product of the reactants (like water and isocyanate producing carbon dioxide). These blowing agents are called chemical blowing agents. Or the blowing agent may be a physical blowing agent, i.e. a non-reactive compound contained in the polymeric composition that is able to generate bubbles in the polymeric matrix during its formation, thereby leading to foam.

However, polyurethane foams derived from polyisocyanates are associated with environmental issues because isocyanate raw materials, in particular methylene diphenyl 4,4'-diisocyanate (MDI) and toluene diisocyanate (TDI), the most widely used isocyanates in the polyurethane industry, and the corresponding aromatic diamines are classified as toxic (carcinogenic, mutagenic and reprotoxic substances). Prolonged exposure may lead to health problems such as asthma or other pulmonary diseases. They are also produced from the even more toxic and explosive phosgene and their decomposition induces the formation of carcinogenic mutagenic reprotoxic products. Due to these concerns, the handling of isocyanate is strictly regulated by REACH.

Therefore, there is a need to develop greener and safer ways to produce sustainable PUs which are not derived from polyisocyanates. The synthesis of non-isocyanate polyurethanes (NIPUs) by copolymerization of a bicyclic carbonate monomer and a diamine represents one of the most promising alternatives to the conventional synthesis of PUs. These polymers are also referred to as polyhydroxyurethanes (see reaction scheme below). See "Isocyanate-Free Routes to Polyurethanes and Poly(hydroxy Urethane)s", by L. Maisonneuve, O. Lamarzelle, E. Rix, E. Grau, H. Cramail, *Chem. Rev.*, 2015, 115, 22, 12407-12439.

Reaction Scheme: synthesis of NIPUs by polyaddition of poly(cyclic carbonate)s with poly(amine)s.

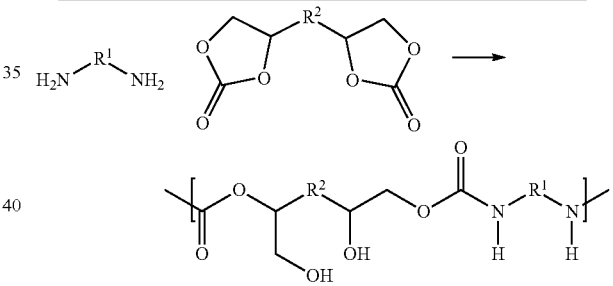

Finding efficient strategies to foam NIPUs under industrially relevant conditions or by conventional industrial processes (reactive extrusion foaming, reactive molding, foaming in place . . . ) is highly challenging and strategic for many key suppliers to develop novel products while respecting the environmental regulations. Foaming curable NIPU formulations by a self-blowing approach is for now difficult. Cyclic carbonates display a different reactivity compared to polyisocyanates and unlike conventional PUs, the simple addition of water within the NIPU formulation does not promote the spontaneous in-situ formation of $CO_2$ as a blowing agent. To date, microcellular NIPU foams with densities of 100-300 kg/m³ have been produced by using solkane, a fluorinated solvent, (as described in EP 3199569 and by Mulhaupt et al., "Flexible and Bio-Based Nonisocyanate Polyurethane (NIPU) Foams", Macromol. Mater. Eng., 2016, 301, 944-952) or the supercritical $CO_2$ technology following a two-step process (as described by Detrembleur et al., "$CO_2$-blown microcellular non-isocyanate polyurethane (NIPU) foams: from bio- and $CO_2$-sourced monomers to potentially thermal insulating materials", Green Chem., 2016, 18, 2206-2215) as physical blowing agents by starting from a curable formulation or preformed polymers, respectively. Besides the physical blowing agents, Caillol et al. (Caillol et al., "A new way of creating cellular polyurethane materials: NIPU foams", Eur. Polym. J., 2015, 66, 129-138 and Caillol et al., "Room temperature flexible isocyanate-free polyurethane foams", Eur. Polym. J., 2016, 84, 873-888) reported on the use of Momentive MH15 as chemical blowing agent to produce NIPU foams with densities of 100-300 kg/m$^3$ from reactive formulations either at 80-120° C. for 14 h or at room temperature (formation of foams in 7 days). However, Momentive MH15 releases highly flammable hydrogen (the blowing agent) by chemical decomposition. This feature makes the use of Momentive MH15 highly risky and complicated to handle on an industrial scale. In 2018, North et al. (North & al., "Renewable Self-Blowing Non-Isocyanate Polyurethane Foams from Lysine and Sorbitol", Eur. J. Org. Chem. 2018, 4265-4271) published the formation of self-blowing NIPU foams by decarboxylation of a specific cyclic carbonate, sorbitan bis-carbonate, through an intramolecular side-reaction induced by amines (see reaction scheme below). This side reaction, typically observed at a low level, only allowed to form NIPU matrix containing bubbles rather than a low density NIPU foam, and was only observed for this specific bis-carbonate and is thus limited in scope.

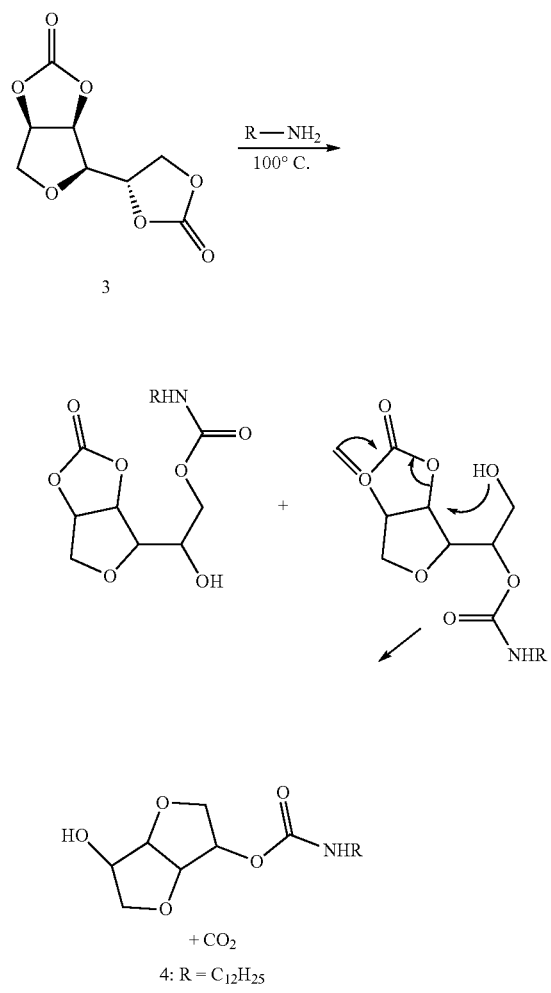

Reaction Scheme: Reaction responsible for the formation of the blowing agent ($CO_2$) in the North work.

The production of a large diversity of NIPUs foams from self-blowing formulations using easily accessible starting products of low cost under solvent-free conditions is currently a challenge. One of the major difficulties of self-blowing procedures is to generate the blowing agent when the NIPU is crosslinked enough to trap the blowing agent and to keep the bubbles inside the polymer matrix. If the NIPU formulation is not viscous enough (not cured enough), the blowing agent leaves the matrix and no foam is formed. If the NIPU is too much crosslinked (too much cured), the blowing agent cannot foam the matrix because the NIPU is too rigid and impedes the expansion.

The present invention therefor seeks to provide a self-blowing formulation to prepare NIPU foams of varying density and good foam quality. The present invention further seeks to provide a process to prepare NIPU foams from said self-blowing formulations that is easy to implement on an industrial scale.

DESCRIPTION OF THE INVENTION

The inventors of the present invention have succeeded in providing such a formulation and process meeting all these needs.

According to one aspect of the present invention a curable isocyanate-free formulation for preparing a polyurethane self-blowing foam is provided, said formulation comprising at least one multifunctional cyclic carbonate having at least two cyclic carbonate groups at the end of the chain (compound A), at least one multifunctional amine (compound B), at least one multifunctional thiol (compound C) and at least one catalyst (compound D).

According to another aspect of the present invention a process for preparing a polyurethane self-blowing foam is provided comprising the steps of providing said formulation and curing it so as to promote the formation of $CO_2$ and form a non-isocyanate polyurethane foam.

According to yet another aspect of the present invention a non-isocyanate polyurethane foam is provided by said process using said formulation.

According to yet another aspect of the present invention a process for recycling said polyurethane foam by compression molding or extrusion is provided.

According to yet another aspect of the present invention a recycled polyurethane foam processed as film, coating, adhesive, fibre or as bulk material is provided.

The inventors surprisingly found that cyclic carbonates undergo decarboxylation upon reaction with thiols in the presence of an appropriate catalyst, typically an (organo) base, within the NIPU formulation (mixture of polyamines and polycyclic carbonates), thereby generating in-situ the blowing agent leading to the formation of NIPU foams (see reaction scheme below).

Reaction Scheme: General scheme for the formation of self-blowing NIPUs according to the invention (for sake of clarity, it is illustrated for non-crosslinked NIPUs).

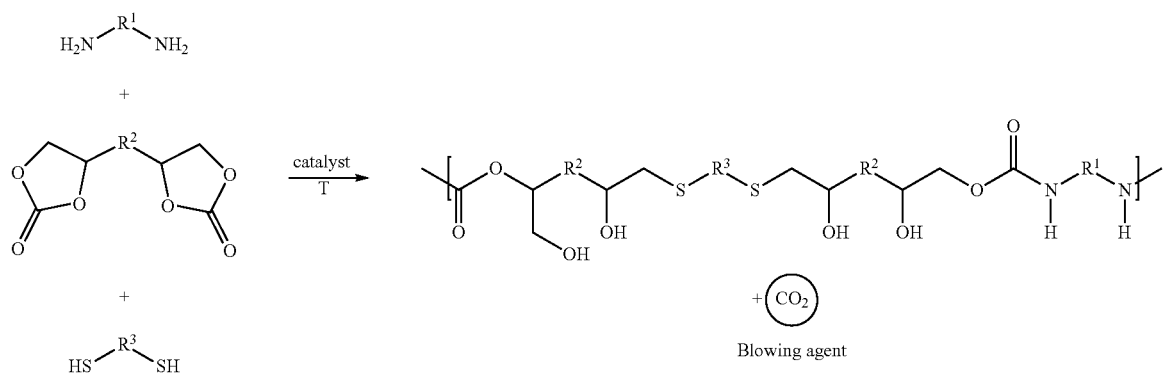

The incorporation of thiols within the NIPU formulation surprisingly provides self-blowing NIPU foams generally at a temperature of from 60° C. to 160° C. of which the density and mechanical properties may be adjusted by controlling the thiol content and structure, and carbonate/amine composition and structure. The formation of NIPU polymers occurs simultaneously with the decarboxylative alkylation of thiols with carbonates, promoting the expansion of the material upon heating generally within 1 min (e.g. at high temperature such as 160° C.) to 24 h, providing flexible to rigid foams with densities generally within the range of 10 kg/m$^3$ to 800 kg/m$^3$. As an additional advantage, besides forming the blowing agent ($CO_2$), the reaction of thiols with the cyclic carbonates forms thioether linkages that are incorporated within the polymer structure, and therefore contribute also to the formation of the polymer and thus helps fixating the 3D structural morphology of the foams. The content of urethane and thioether linkages depends on the amine/thiol content in the initial formulation. The structure of the NIPU foam of the present invention is therefore different to those of the state of the art that do not contain thioether linkages.

The thiol further plays a role as a reactive diluent and allows to adjust the viscosity of the starting formulation. Controlling the viscosity of the precursor mixture is a key parameter to allow the easy deposition of the formulations onto various substrates without using organic solvents. The NIPU formulation may be applied by any suitable means. Examples include the deposition with syringes, through pistols or injectors, through continuous processes, through reactive molding or reactive foaming, by spraying means, through extruders.

BRIEF DESCRIPTION OF THE DRAWINGS

FIG. 1 shows a proton NMR spectrum of a crude product relevant to the present invention.
FIG. 2 shows the time evolution of the propylene carbonate of compound E. aninolysis.
FIG. 3 shows the time evolution of the decarboxalative alkylation of compound C in a relevant reaction of the present invention.
FIG. 4 shows the time evolution of propulene carbonate conversion of a reaction relevant to the present invention.
FIG. 5 shows comparative kinetic studies of reactions relevant to the present invention.
FIG. 6 shows the influence of temperature on a reaction relevant to the present invention.
FIG. 7 shows a SEM characterization of a foam of example 4.
FIG. 8 shows a SEM characterization of a foam of example 5.
FIG. 9 shows a SEM characterization of a foam of example 6.
FIG. 10 shows a SEM characterization of a foam of example 8.
FIG. 11 shows a SEM characterization of a foam of example 9.
FIG. 12 shows a SEM characterization of a foam of example 10.

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The terms "about" or "approximate" and the like are synonymous and are used to indicate that the value modified by the term has an understood range associated with it, where the range can be +20%, +15%, +10%, +5%, or +1%. The term "substantially" is used to indicate that a result (e.g., measurement value) is close to a targeted value, where close can mean, for example, the result is within 80% of the value, within 90% of the value, within 95% of the value, or within 99% of the value.

In the following description, the expressions "isocyanate free" and "non-isocyanate" refer to compositions which do not contain polyisocyanates.

The term "ketone" denotes a C=O group.

The term "heteroatom" denotes an atom selected from N, O, S, Si and S(O)n (where n is 0, 1 or 2), SiO.

The term "cycloalkyl" denotes a monovalent or bivalent 3 to 8 membered carbon ring, for example cyclopropyl, cyclobutyl, cyclopentyl, cyclohexyl, cycloheptyl or cyclooctyl.

The term "heterocycle" denotes monovalent or bivalent non-aromatic mono- or bi-cyclic radical of four to nine ring atoms in which one to three ring atoms are heteroatoms independently selected from N, O and S(O)n (where n is 0, 1 or 2), with the remaining ring atoms being C. Particular is piperidyl or a cyclic carbonate.

The term "aryl" denotes a monovalent or bivalent aromatic carbocyclic group containing 6 to 14, particularly 6 to 10, carbon atoms and having at least one aromatic ring or multiple condensed rings in which at least one ring is aromatic. Examples include phenyl, benzyl, naphthyl, biphenyl, anthryl, azalenyl or indanyl.

The term "heteroaryl" denotes a monovalent or bivalent cyclic aromatic group containing 1, 2 or 3 heteroatoms, having at least one aromatic ring or multiple condensed rings in which at least one ring is aromatic. The aromatic ring may be a 6 membered ring, such as pyridinyl, or a 5-membered ring, such as thiazolyl, isoxazolyl, isothiazolyl, oxadiazolyl, imidazolyl, triazolyl or thiadiazolyl.

The formulation of the present invention comprises at least one multifunctional cyclic carbonate having at least two cyclic carbonate groups at the end of the chain (compound A), at least one preferably aliphatic, multifunctional amine (compound B), at least one multifunctional thiol (compound C) and at least one catalyst (compound D).

Advantageously, the curable formulation of the invention is a liquid or a viscous liquid at ambient temperature (25° C.). Preferably, the viscosity of said curable formulation is lower than or equal to 20 000 mPa·s at 50° C., more preferably lower than 10 000 mPa·s at 50° C., most preferably lower than 5 000 mPa·s at 50° C. as measured with an oscillatory rheometer, with oscillatory frequency sweep at 50° C., 5% deformation, 100-0.1 rad s$^{-1}$. In case the curable formulation is not a liquid or a viscous liquid at ambient temperature it is rendered liquid by heating to a temperature of between 40 and 80° C.

Compound A is chosen from multifunctional cyclic carbonates having at least two cyclic carbonates at the end of the chain (or so-called multifunctional external cyclic carbonates) or a mixture thereof. In general, said compounds A correspond to formula (I)

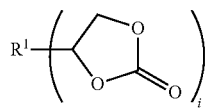

Formula (I)

wherein
i is an integer higher than or equal to 2, in particular from 2 to 10, more particularly 2 or 3,
R$^1$ is a carbon bond between the cyclic carbonate rings or is a linear or branched hydrocarbon chain, which may be unsubstituted or substituted and wherein one or several hydrocarbon groups of said hydrocarbon chain may be replaced by an heteroatom, a ketone, a cycloalkyl, an heterocycle, an aryl or an heteroaryl, each of which may be unsubstituted or substituted, said hydrocarbon chain having at least 2 carbon atoms, in particular from 3 to 60 carbon atoms.

Suitable examples of compounds A for use in the present invention include the following:

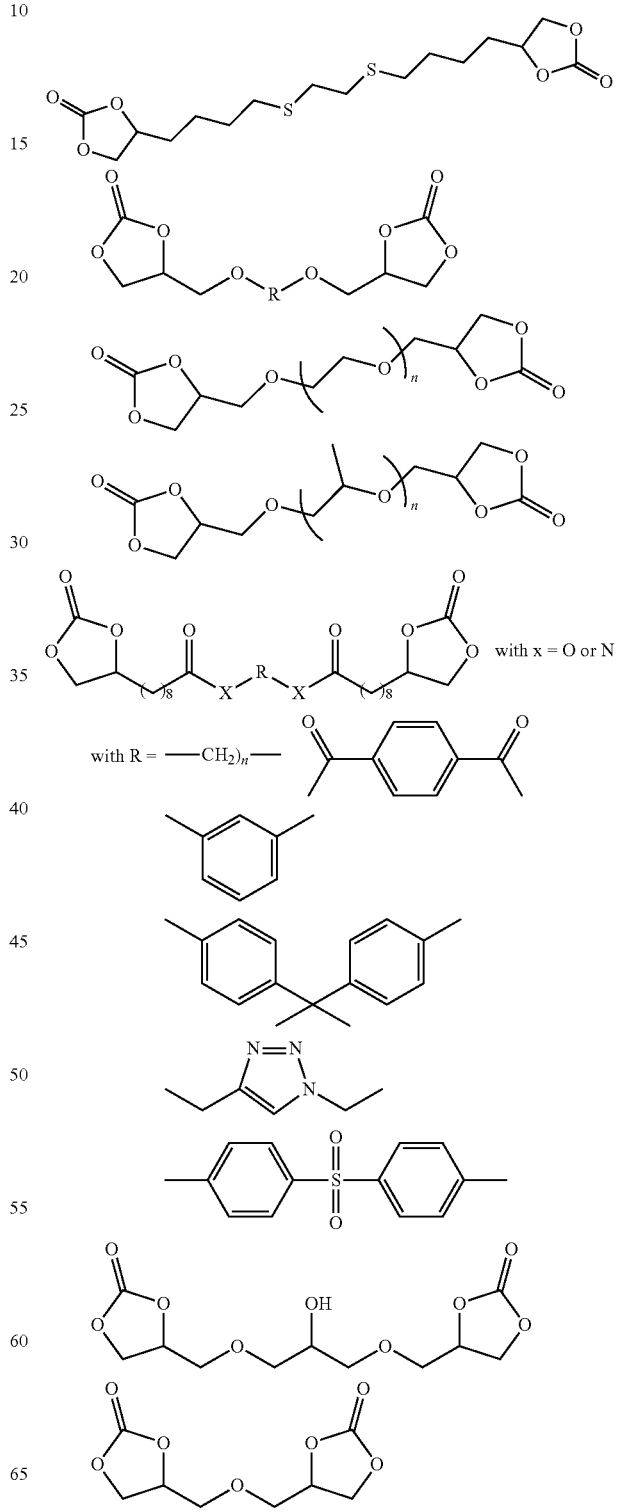

-continued

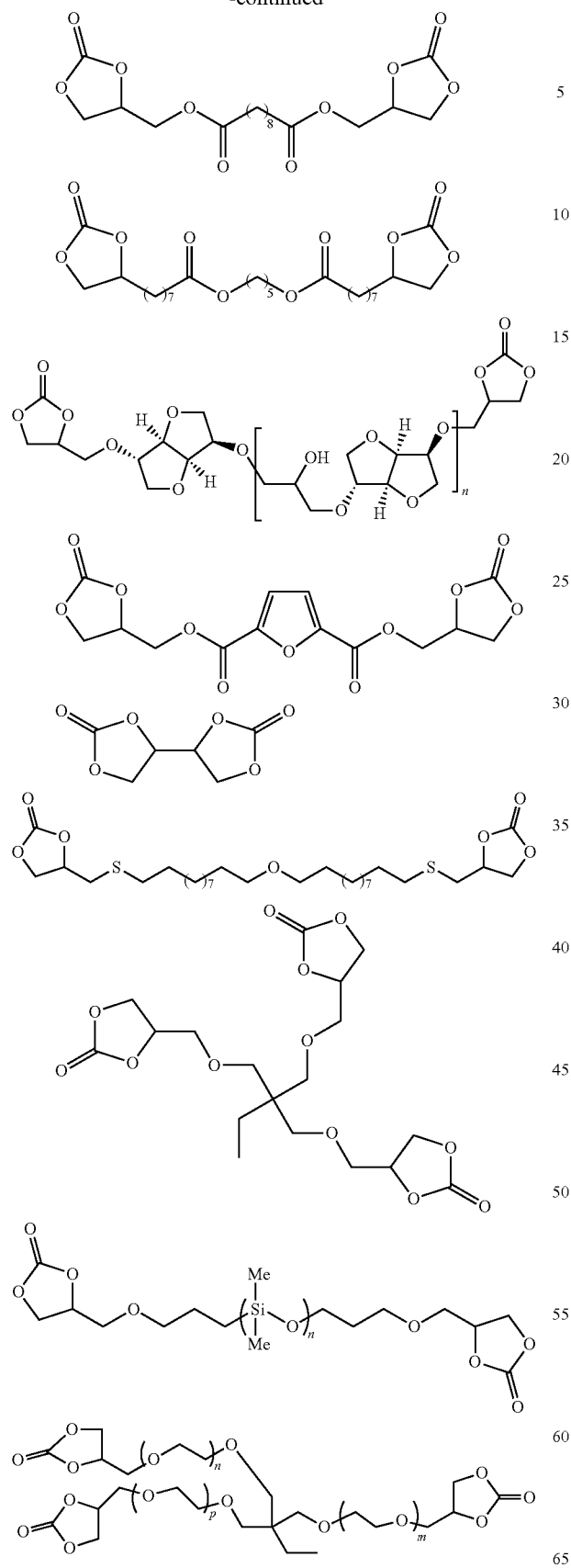

Particularly preferred compounds A are

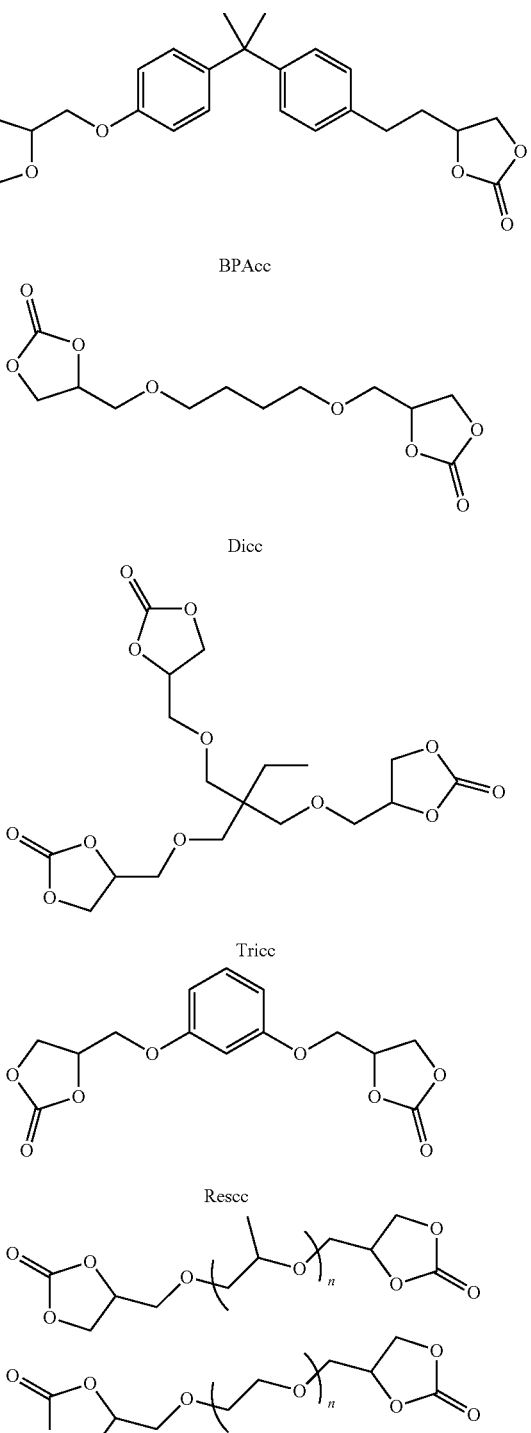

Compounds A can be prepared at large scale by any methods known by the art, for instance from polyols by converting all or part of the alcohol functions of said polyol into glydicylether functions, followed by carbonation of said glycidylether functions as described in EP 3 199 569A1, or by epoxidation of molecules bearing at least 2 external double bonds, followed by the (organo)catalyzed carbon dioxide coupling reaction as described by L.-N. He & al., "One-pot stepwise synthesis of cyclic carbonates directly from olefins with $CO_2$ promoted by $K_2S_2O_8$/NaBr", *J. CO2 Util.*, 2016, 16, 313-317 and by R. Wang & al., "Direct Synthetic Processes for Cyclic Carbonates from Olefins and $CO_2$", *Catal. Sum. from Asia*, 2011, 15, 49-54, and by C. Detrembleur & al., "Organocatalyzed coupling of carbon dioxide with epoxides for the synthesis of cyclic carbonates: catalyst design and mechanistic studies", *Catal. Sci. Technol.*, 2017, 7, 2651.

Compound B is chosen from multifunctional amines or a mixture thereof. In general, said compounds B correspond to formula (II)

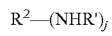   Formula (II)

wherein j is an integer higher than or equal to 2, in particular from 2 to 6, $R^2$ is an aryl or a heteroaryl, each of which may be unsubstituted or substituted, or a linear or branched hydrocarbon chain, which may be unsubstituted or substituted, and wherein one or several hydrocarbon groups of said hydrocarbon chain may be replaced by a heteroatom, a cycloalkyl or an heterocycle, each of which may be unsubstituted or substituted, said hydrocarbon chain having at least 2 carbon atoms, in particular from 2 to 60 carbon atoms, more particularly from 2 to 20 carbon atoms, even more particularly from 2 to 15 carbon atoms, and wherein R' each independently may be hydrogen, an alkyl or a cycloalkyl.

Compound B acts as a hardener by reacting with cyclic carbonate groups of compounds A, and optional compounds E and F as described hereinafter, thereby cross-linking the cyclic carbonate chains to each other.

Examples of suitable compounds B for use in the present invention include those amines which are classically used for epoxy curing, for instance diamines, in particular linear aliphatic diamines, such as 1,2-diaminoethane, 1,3-diaminopropane, butane-1,4-diamine, pentane-1,5-diamine, 1,6-diaminohexane, or 1,12-diaminododecane, or cyclic aliphatic diamines, such as isophoronediamine (IPDA), triamines, such as tris(2-aminoethyl)amine, or any other polyamines, such as polyethylene imine (e.g. Lupasol® FG from BASF) or dimeric fatty acid diamines such as Priamine® 1074 or Priamine® 1071 from Croda, or Jeffamine® (D, ED, EDR or T series) from Huntsman Petrochemical, LLC, or aromatic diamine, such as o-xylylenediamine, m-xylylenediamine, p-xylylenediamine or 1,2-diphenylethylenediamine The use as compound B of multifunctional amines with long chain segments and/or a low number of —$NH_2$ functionalities (such as Lupasol® FG and IPDA) will yield flexible foams, while the use of polyamines with short chain segments and/or a high number of —$NH_2$ functionalities (such as 1,6-diaminohexane or Priamine® 1074) will yield rigid foams.

Alternatively, secondary multifunctional amines can also be used instead of primary ones, or be used in combination with primary ones.

Particularly preferred compounds B are

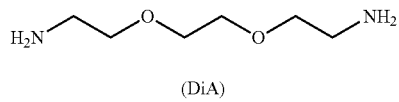

(DiA)

Compound C is chosen from multifunctional thiols or a mixture thereof. In general, said compounds C correspond to formula (III)

   Formula III wherein k is an integer higher than or equal to 2, in particular from 2 to 6, $R^3$ is a linear or branched hydrocarbon chain, which may be unsubstituted or substituted, and wherein one or several hydrocarbon groups of said hydrocarbon chain may be replaced by an heteroatom, a ketone, a cycloalkyl or an heterocycle, each of which may be unsubstituted or substituted, said hydrocarbon chain having at least 2 carbon atoms, in particular from 2 to 60 carbon atoms, more particularly from 2 to 20 carbon atoms, even more particularly from 2 to 15 carbon atoms, or $R^3$ is a linear or branched polymeric group.

Examples of suitable compounds C for use in the present invention include bi-thiols, tri-thiols, tetra-thiols or hexa-thiols, preferably pentaerytrittetrathiol, thiol trimethyol propane, pentaerythritol tetra (3-mercaptopropionate), trimethylolpropane tri (3-mercaptopropionate), pentaerythritol tetrathioglycolate and/or trimethylolpropane thioglycolate, tris [2-(3-mercaptopropionyloxy)ethyl] isocyanurate. Compound C can also be a telechelic, branched or multiarms polymer bearing thiol groups at each chain-end (such as polyethylene glycol dithiol or polypropylene glycol dithiol) or along the polymer backbone as pendant groups, or a peptide or protein containing at least two thiols.

Particularly preferred compounds C, which also have the benefit of having almost no odor, are HS$\diagup\diagup$O$\diagup\diagup$O$\diagup\diagup$SH (DiTh)

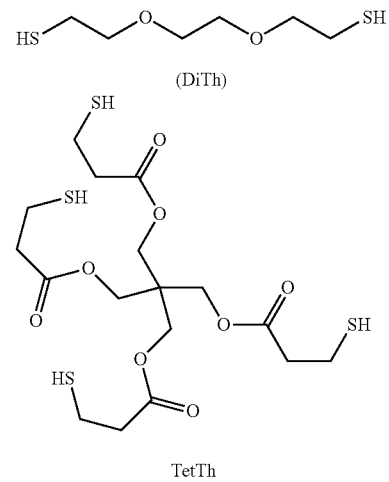

TetTh

Compound D, the catalyst, is used to increase the kinetics of the carbonate/amine reaction (thus the formation of NIPU) and to permit the decarboxylation of the cyclic carbonate and thus the foaming. A wide range of catalysts can be used (see for instance Blain et al., Green Chemistry 2014, 16, 4286). The choice of suitable catalyst depends on the specific formulation used but also on the temperature used to form the foam. As non-limiting examples, compound D can be chosen from amine catalysts, such as triazabicyclodecene (TBD), 1,4-diazabicyclo[2.2.2]octane (DABCO), 1,8-diazabicyclo[5.4.0]undec-7-ene (DBU), 7-Methyl-1,5,7-triazabicyclo[4.4.0]dec-5-ene (MTBD), or other guanidines and amidines, trimethylhydroxyethyl ethylene diamine, trimethylaminopropylethanolamine, dimethylethanolamine, bis(2-dimethylaminoethyl) ether, triethylenediamine, dimethylaminocyclohexane, N-methyl morpholine, dimethylaminopyridine (DMAP), trimethylamine ($NEt_3$), trimethylamine, phosphazenes, phosphines (triaryl and trialkylphosphines).

The compound D may also be chosen from ionic salts or ionic liquids composed of a combination of a cation and an anion. The cation may be selected from alkali metals such as $Na^+$, $Li^+$, $K^+$, $Cs^+$ or other metal such as $Mg^{2+}$, $Ca^{2+}$ or organic cations including ammonium (formula 1), phosphonium (formula 2), imidazolium (formula 3), pirazolium (formula 4), triazolium (formula 5), tetrazolium (formula 6), pyridinium (formula 7), piperidinium (formula 8), pyrrolidinium (formula 9), guanidinium (formula 10) or amidinium (formula 11).

wherein:
$R_1$, $R_2$, $R_3$, $R_4$, $R_5$ and/or $R_6$ is independently an hydrogen or an aromatic ring or linear or branched hydrocarbon chain, one or several carbon atoms of which may be replaced with an heteroatom, a cycloalkyl or an heterocycle, said hydrocarbon chain having at least 1 carbon atom, in particular from 1 to 60 carbon atoms, more particularly from 1 to 20 carbon atoms, even more particularly from 1 to 10 carbon atoms.

The anion may be selected from halide ($I^-$, $Br^-$, or $Cl^-$), carbonate ($CO_3^{2-}$), hydroxide ($OH^-$), carboxylate (formula 12) or dicarboxylate (such as oxalate), phenolate (formula 13), catecholate (formula 14), pyrogallolate (formula 15), boronate (formula 16), imidazolide (formula 17).

wherein:
$R_1$, $R_2$ and/or $R_3$ is independently an hydrogen or an aromatic ring or linear or branched hydrocarbon chain, one or several carbon atoms of which may be replaced with an heteroatom, a cycloalkyl or an heterocycle, said hydrocarbon chain having at least 1 carbon atoms, in particular from 1 to 60 carbon atoms, more particularly from 1 to 20 carbon atoms, even more particularly from 1 to 10 carbon atoms.

Other suitable compounds D include metal salts of inorganic acid or organometallic catalysts such as stannous octoate, lead octoate, dibutyltin dilaurate, potassium acetate or potassium ethyl-hexoate, or mixtures thereof. Further suitable compounds D include phosphines such as triarylphosphines and monoalkylbiarylphosphines, bases, thioureas, phosphazenes, carbenes or masked carbenes (as described by Taton et al in "N-Heterocyclic carbenes (NHCs) as organocatalysts and structural components in metal-free polymer synthesis", Chem. Soc. Rev. 2013, 42, 2142).

Mixtures of several different catalysts, of the same class or not, may also be used.

Preferably the decarboxylative alkylation of polyfunctional thiol (compound C) and the aminolysis of cyclic carbonates (compound A) should occur with similar rates. Preferentially, the aminolysis of cyclic carbonates should be slightly faster to enable the formation of polymer chains of sufficient viscosity to be foamed by release of in-situ generated $CO_2$. Therefore proper choice of the catalyst (compound D) to help adjusting the aminolysis rate of (a)cyclic carbonates and the decarboxylation rate by dithiols may be important. Particularly preferred catalysts for use as compound D in the present invention are 1,8-diazabicyclo[5.4.0]undec-7-ene (DBU), tetrabutyl ammonium oxalate and tetrabutyl ammonium phenolate (TBAP).

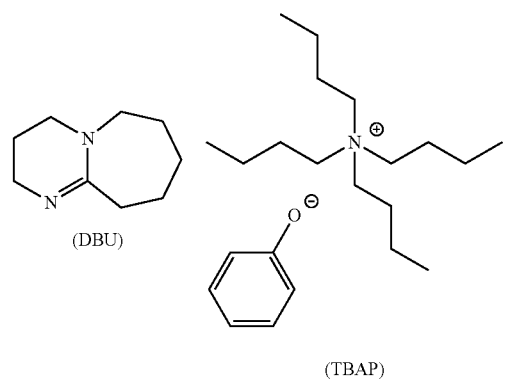

(DBU)    (TBAP)

Optionally the formulation of the present invention may further contain any one of or a mixture of monofunctional cyclic carbonate (compound E), multifunctional cyclic carbonates having at least two cyclic carbonate groups within the chain (compound F), monofunctional thiols (compound G) and polyepoxides (compound H).

Compound E generally acts as a reactive diluent and is chosen from monofunctional cyclic carbonates or a mixture thereof, which preferably correspond to formula (IV) or a mixture thereof.

Formula (IV)

wherein
$R^4$ is hydrogen or a linear or branched hydrocarbon chain, which may be unsubstituted or substituted e.g. with a functional group such as an alcohol, a secondary or tertiary amine, a carboxylic acid, an alkene, an ester, etc. and wherein one or several hydrocarbon groups of said hydrocarbon chain may be replaced by an heteroatom, a cycloalkyl or an heterocycle, each of which may be unsubstituted or substituted, said hydrocarbon chain having at least 1 carbon atom, in particular from 2 to 60 carbon atoms, more particularly from 2 to 20 carbon atoms, even more particularly from 2 to 15 carbon atoms.

Suitable examples of compounds E for use in the present invention are ethylene carbonate, propylene carbonate, 4-vinyl-1,3-dioxolan-2-one, etc.

Compound F contributes to the formation of the NIPU matrix; due to sterical hindrance by the internal cyclic carbonates it reacts more slowly than compound A. Compound F is chosen from multifunctional internal cyclic carbonates thus having at least two cyclic carbonate groups within the chain (so-called internal cyclic carbonates) or any mixture thereof. Compound F may correspond to any one of formula (V), (VI) and (VII) or a mixture thereof.

Formula (V)

Partially cyclocarbonated epoxidized vegetable oils or fatty acid/esters can also be used. Examples of suitable compounds F are:

Formula (VI)

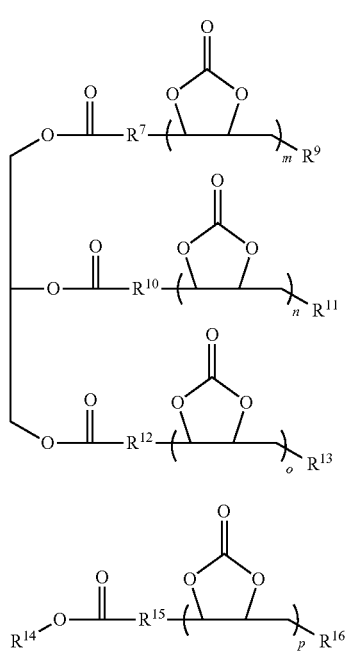

Formula (VII)

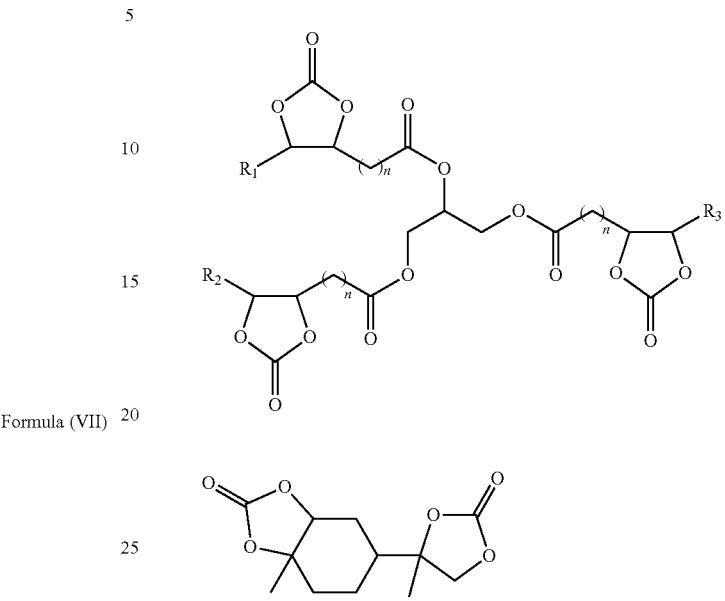

wherein:
l and p are integers higher than or equal to 2, in particular from 2 to 6,
m, n and o are integers higher than or equal to 1,
$R^6$ is a linear or branched hydrocarbon chain, which may be unsubstituted or substituted and wherein one or several hydrocarbon groups of said hydrocarbon chain may be replaced by an heteroatom, a ketone, a cycloalkyl or an heterocycle, an aryl or an heteroaryl, each of which may be unsubstituted or substituted, said hydrocarbon chain having at least 2 carbon atoms, in particular from 2 to 60 carbon atoms, more particularly from 2 to 20 carbon atoms, even more particularly from 2 to 15 carbon atoms,
$R^5$ is a linear hydrocarbon chain, which may be unsubstituted or substituted and wherein one or several hydrocarbon groups of said hydrocarbon chain may be replaced by an heteroatom, a ketone, a cycloalkyl or an heterocycle, an aryl or a heteroaryl, each of which may be unsubstituted or substituted, said hydrocarbon chain having at least 2 carbon atoms, in particular from 2 to 60 carbon atoms, more particularly from 2 to 20 carbon atoms, even more particularly from 2 to 15 carbon atoms, and wherein $R^5$ may form a ring structure with $R^6$,
$R^7$, $R^9$, $R^{10}$, $R^{11}$, $R^{12}$, $R^{13}$, $R^{15}$ and $R^{16}$ each independently is a linear hydrocarbon chain, said hydrocarbon chain having at least 2 carbon atoms, in particular from 2 to 60 carbon atoms, more particularly from 2 to 20 carbon atoms, even more particularly from 2 to 15 carbon atoms,
$R^{14}$ is hydrogen or a linear or branched hydrocarbon chain, said hydrocarbon chain having at least 1 carbon atom, in particular from 1 to 5 carbon atoms, more particularly from 1 to 3 carbon atoms.

Compound F are all molecules containing internal cyclic carbonates that can be prepared by all methods known by the art such as by the (organo)catalyzed coupling of carbon dioxide to epoxidized vegetable oils or fatty esters/acids.

Compound G also reacts with the cyclic carbonate to generate $CO_2$ but will not crosslink the matrix due to its monofunctionality and allows to graft interesting groups to NIPU. Compound G is chosen from monofunctional thiol or any mixture thereof, and preferably corresponds to formula (VIII)

$$R^{17}—SH \qquad \text{Formula (VIII)}$$

wherein:
$R^{17}$ is an aryl group which may be unsubstituted or substituted or a linear of branched polymeric group or a polydialkyl siloxane chain or a linear or branched hydrocarbon chain which may be unsubstituted or substituted e.g. with a functional group such as alcohol, primary, secondary or tertiary amine, carboxylic acid, ester, etc., and wherein one or several hydrocarbon groups of said hydrocarbon chain may be replaced with a heteroatom, a ketone, a cycloalkyl or an heterocycle, each of which may be unsubstituted or substituted, said hydrocarbon chain having at least 2 carbon atoms, in particular from 2 to 60 carbon atoms, more particularly from 2 to 20 carbon atoms, even more particularly from 2 to 15 carbon atoms.

Compound G can be any monofunctional thiol but monofunctional thiol of high boiling point is preferred. Thioamines such as cysteamine or cysteine are also preferred because the thiol group contributes to the formation of the blowing agent and to the formation of the thioether linkage, and the amine group contributes to the formation of the urethane linkage.

Compound H is chosen from polyepoxides or a mixture thereof and will contribute to the crosslinking of the material. Preferably compound H corresponds to any one of formula (IX), (X), (XI) or (XII).

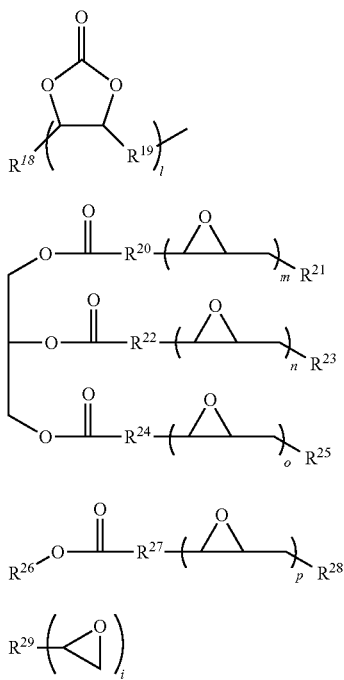

Formula (IX)

Formula (X)

Formula (XI)

Formula (XII)

wherein:
- i is an integer higher than or equal to 2, in particular from 2 to 10,
- l and p are integers higher than or equal to 2, in particular from 2 to 6,
- m, n and o are integers higher than or equal to 1,
- $R^{18}$ is a linear or branched hydrocarbon chain, which may be unsubstituted or substituted, and wherein one or several hydrocarbon groups which may be replaced by an heteroatom, a cycloalkyl or an heterocycle, each of which may be unsubstituted or substituted, said hydrocarbon chain having at least 2 carbon atoms, in particular from 2 to 60 carbon atoms, more particularly from 2 to 20 carbon atoms, even more particularly from 2 to 15 carbon atoms,
- $R^{19}$ is a linear hydrocarbon chain, one or several hydrocarbon groups of which may be replaced by an heteroatom, a cycloalkyl or an heterocycle, said hydrocarbon chain having at least 2 carbon atoms, in particular from 2 to 60 carbon atoms, more particularly from 2 to 20 carbon atoms, even more particularly from 2 to 15 carbon atoms,
- $R^{20}$, $R^{21}$, $R^{22}$, $R^{23}$, $R^{24}$, $R^{25}$, $R^{27}$ and $R^{28}$ each independently is a linear hydrocarbon chain, said hydrocarbon chain having at least 2 carbon atoms, in particular from 2 to 60 carbon atoms, more particularly from 2 to 20 carbon atoms, even more particularly from 2 to 15 carbon atoms,
- $R^{26}$ is hydrogen or a linear or branched hydrocarbon chain, said hydrocarbon chain having at least 1 carbon atom, in particular from 1 to 5 carbon atoms, more particularly from 1 to 3 carbon atoms,
- $R^{29}$ is a linear or branched hydrocarbon chain, one or several hydrocarbon groups of which may be replaced by an heteroatom, a cycloalkyl, an heterocycle, an aryl or an heteroaryl, said hydrocarbon chain having at least 3 carbon atoms, in particular from 3 to 60 carbon atoms, or a polydimethylsiloxane chain or block copolymer containing one polydimethylsiloxane sequence such as poly(ethylene oxide)-b-poly(dimethylsiloxane).

Examples of suitable compounds H are polyepoxides that are used in formulations for epoxy resins, such as epoxidized linseed oil, epoxidized soybean oil, epoxidized rapeseed oil, epoxidized tall oil, or epoxidized peanut oil, poly(dimethyl siloxane) diepoxide, cyclohexane-1,4-dicarboxylic acid-diglycidylester, cyclohexane-1,3-dicarboxylic acid-diglycidylester, cyclohexane-1,2-dicarboxylic acid-diglycidylester, phthalic acid-diglycidylester, isophthalic acid-diglycidylester, terephthalic acid-diglycidylester, norbornenedicarboxylic acid-diglycidylester, 3,4-epoxycyclohexylmethyl-3,4-epoxycyclohexanecarboxylate, Bis((3,4-epoxycyclohexyl)-methyl)adipate, 4,5-epoxytetrahydrophthalic acid-diglycidylester and 4,4'-methylenebis(N,N-diglycidylaniline). Further suitable polyepoxides are aromatic diglycidylether, cyclohexane-1,4-dimethanol-diglycidylether, cyclohexane-1,2-dimethanol-diglycidylether, Bisphenol-A-diglycidylether, Bisphenol-F-diglycidylether, Bisphenol-S-diglycidylether, N,N-di-glycidyl-4-glycidyloxyaniline, 4,4'-methylene-bis(N,N-diglycidylaniline), 1,4-cyclohexanedimethanol-bis(3,4-epoxycyclohexanecarboxylate), epoxidized cycloolefine such as vinylcyclohexene-dioxide and dicyclopentadiene-dioxide, epoxy functional poly(dimethylsiloxane) (such as TEGOMER E-SI 2330 sold by Evonik), epoxy functional (polyethylene glycol), epoxy functional (polypropylene glycol).

Some specific examples of compound H are illustrated below.

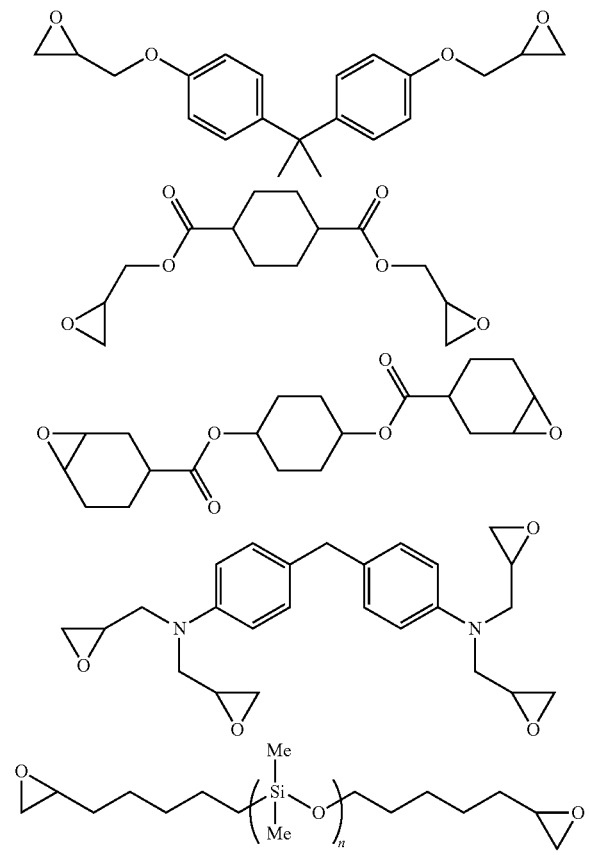

A particularly preferred compound H is

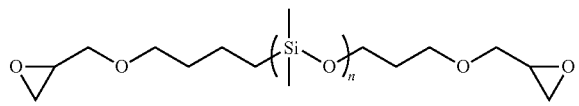

(E-SI 2330)

The amount of compound A generally ranges from 18 wt % to 80 wt %, in particular from 40 wt % to 70 wt %, more in particular from 40 to 60 wt %, the percentage being expressed relative to the total weight of the compounds.

The amount of compound B generally ranges from 10 wt % to 80 wt %, in particular from 10 to 70 wt %, more in particular from 10 wt % to 50 wt %, the percentage being expressed relative to the total weight of the compounds.

The amount of compound C generally ranges from 1 wt % to 60 wt %, in particular from 2 to 40 wt %, more in particular from 5 to 20 wt %, the percentage being expressed relative to the total weight of the compounds.

The molar ratio between compound A, compound B and compound C will affect the foaming of the formulations and the properties of the obtained foams. According to a preferred embodiment of the present invention an equimolar amount of cyclic carbonate groups (from compound A) and respectively amine groups (from compound B)+thiol groups (from compound C) is used.

The amount of compound D generally ranges from 0.1 wt % to 15 wt %, in particular from 0.5 wt % to 7 wt %, the percentage being expressed relative to the total weight of the compounds.

The amount of compound E generally ranges from 0 wt % to 50 wt %, in particular from 1 wt % to 50 wt %, more in particular from 5 wt % to 10 wt %, the percentage being expressed relative to the total weight of the compounds.

The amount of compound F generally ranges from 0 wt % to 50 wt %, in particular from 1 wt % to 50 wt %, more in particular from 2 wt % to 20 wt %, the percentage being expressed relative to the total weight of the compounds.

The amount of compound G generally ranges from 0 wt % to 50 wt %, in particular from 1 wt % to 50 wt %, more in particular from 2 wt % to 10 wt %, the percentage being expressed relative to the total weight of the compounds.

The amount of compound H generally ranges from 0 wt % to 50 wt %, in particular from 0.1 wt % to 50 wt %, more in particular from 0.5 wt % to 20 wt %, the percentage being expressed relative to the total weight of the compounds.

The formulation of the present invention is obtained by mixing the ingredients, compounds A, B, C, D and optionally E, F, G and H at a temperature of between 15 and 120° C., preferably between 25 and 80° C., and more preferably between 25 and 60° C. The mixing can be performed using any suitable mixing equipment, including static mixing equipment, impingement mixing equipment, or other suitable mixing equipment.

Although $CO_2$ blowing agent is generated in-situ the formulation of the present invention may contain additional chemical or physical blowing agent. In particular physical blowing agent may be added, especially when NIPU foams with high thermal insulation performance are targeted. Examples of such suitable physical blowing agents include any of the physical blowing agents used to formulate thermal insulating foams such alkanes (e.g. pentane), cycloalkanes (e.g. cyclopentane) and hydrofluoroalkanes. A preferred nonflammable liquid hydrofluorocarbon with no ozone depletion potential is Solkane 365/227 or Solvokan. The amount of these additional blowing agents ranges from 0 wt % to 70 wt %, preferably between 10 wt % and 30 wt %, the percentage being expressed relative to the weight of the formulation. These blowing agents are added to the formulation containing all the other ingredients generally at a temperature between 10 to 30° C. in order to avoid complete vaporization of the blowing agent before effective mixing with the reaction mixture.

The reaction mixture may further contain optional ingredients such as plasticizers, fillers, colorants, preservatives, odor masking agents, flame retardants, smoke suppressants, thixotropic agents, mould release agents, surfactants, foam stabilizers, biocides, antioxidants, UV stabilizers, antistatic agents or foam cell nucleators.

Stabilizers may be used to stabilize the NIPU foams. Suitable stabilizers are reactive polydimethylsiloxane and polyethylene oxide. Fillers may also be added, such as silica, clays, cellulose nanowhiskers, carbon black, carbon nanotubes, graphene, etc. The addition of fillers may advantageously create nucleation nodes for the control of the foam density and size distribution of the cells (from 1 µm to 1-2 mm). Fillers may also improve the mechanical performance of the foams. Foams containing fillers are referred to as nanocomposite foams. Fillers can be functionalized by appropriate reactive groups such as epoxides, amines, cyclic carbonate or thiol making them reactive.

The mechanical performance of the foams (from flexible to rigid materials) may also be adjusted by selecting suitable structure of cyclic carbonates (compounds A, E, F) and/or amines (compound B) and/or thiols (compounds C and G) and/or polyepoxides (compound H).

According to the invention, the blowing agent is formed by decarboxylation of cyclic carbonates (compounds A, E and F) by thiols (compound C) in the presence of a catalyst (compound D). The blowing agent (carbon dioxide) creates holes in the polymer matrix, thereby producing a cellular structure. Beside the production of the blowing agent, this reaction leads to the formation of thioether links according to the following reaction:

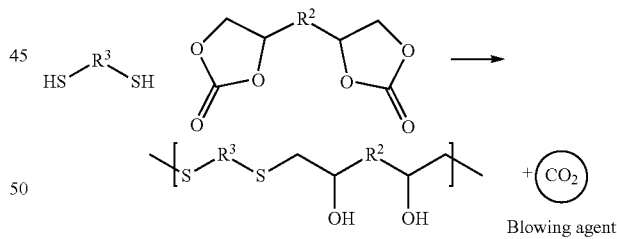

This reaction therefore leads to the chemical anchoring of the thiol to the polymer chain and contributes to the crosslinking of the polymer. This is particularly important for the mechanical properties of the final materials but also for avoiding the diffusion of the thiol within the polymer matrix after the foam preparation. The formation of the blowing agent generally occurs at a temperature of between 25° C. and 200° C., preferably between 40 and 150° C. and more preferably between 60 and 120° C.

According to another aspect of the present invention a process for preparing a self-blowing non-isocyanate polyurethane foam is provided comprising the steps of providing a formulation as described above by mixing compounds A, B, C and optionally other additives, in the presence of compound D so as to form a viscous mixture and curing said formulation so as to promote the formation of $CO_2$ and form a non-isocyanate polyurethane foam.

The curing and the expansion of the polymer matrix occur simultaneously and can be achieved within a relatively short time after the mixing of the ingredients (between 10 seconds to 24 hours) and leads to a homogeneous foam. Although the foaming can be fast (1 min to few hours), the expanded reaction mixture can be cured for a longer time (2 to 24 h) by heating until it is in tack free state. Curing to a tack-free state generally takes place within a few hours (e.g. 14 h at 100° C.).

The curing and expansion generally occurs at a temperature of between 25° C. and 200° C., preferably between 40 and 150° C. and more preferably between 60 and 120° C.

Optionally, compounds E, F, G and/or H can be added to the ingredients in the first step of the process in order to adjust the viscosity of the mixture and/or the final properties of the foam. These compounds may be added independently from each other or may be added in the form of a mixture.

According to another embodiment of the present invention the process for preparing a self-blowing non-isocyanate polyurethane foam comprises the steps of mixing compounds A and B in the presence of compound D so as to form a viscous mixture, partially curing said mixture so as to form a non-isocyanate polyurethane viscous prepolymer, adding compound C to said prepolymer and curing the said mixture so as to form a non-isocyanate polyurethane foam. Optionally, compounds E, F, G and/or H can be added to the ingredients in the first step of the process or in step 3 wherein compound C is added in order to adjust the viscosity of the mixture and/or the final properties of the foam.

By partially curing is here meant the increase of viscosity of the formulation at a given temperature. The viscosity may for example be increased by a factor 10, by a factor 100, or even by a factor 1000 depending on the time and temperature of pre-curing as well as on the ingredients mixed. It also means that compounds A and B may start to be cross-linked. After partially curing, it is still possible to mix the compounds and/or to add a further compound. Such mixing after a partially curing may be a manual mixing or a mechanical mixing. The viscosity may be obtained by rheological measurements for example. The step of partially curing may for example be for 4 hours at ambient temperature. Viscosity may for example be increased up to 10 000 Pa·s.

According to a further embodiment of the present invention the process involves mixing compounds A and B in the presence of compound C so as to form a viscous mixture, partially curing said mixture so as to form a non-isocyanate polyurethane viscous prepolymer loaded by unreacted compound C, adding compound D to said prepolymer mixture and curing said mixture so as to promote the formation of $CO_2$ and form a non-isocyanate polyurethane foam. Optionally, compounds E, F, G and/or H can be added to the ingredients in the first step of the process in order to adjust the viscosity of the mixture and/or the final properties of the foam.

The formation of the prepolymer occurs by curing generally at a temperature of between 25° C. and 200° C., preferably between 40 and 150° C. and more preferably between 60 and 120° C. This step is stopped before the polymer is fully crosslinked, thus when the mixture remains viscous. Because the polymer is not fully crosslinked, it is still possible to add a compound and/or to mix the formulation.

Compound C is added and mixed to the ingredients generally at a temperature between 15 and 120° C., preferably between 20 and 80° C. and more preferably between 25 and 60° C.

The final curing and expansion of the foam generally occurs at a temperature between 25° C. and 200° C., preferably between 40 and 150° C. and more preferably between 60 and 120° C.

The process of the present invention provides the following advantages: no by-products are formed, no volatile organic compounds are released, no organic solvents are used. Further the present process is compatible with existing manufacturing processes for conventional PU foaming and is tolerant to air, water or other moisture.

According to a third aspect of the present invention a non-isocyanate polyurethane foam is provided obtainable by said process.

The obtained polyurethane foam contains both urethane and thioether linkages, whose contents are fixed by the content of amine, cyclic carbonate and thiol used in the formulations.

The process of the invention makes it possible to prepare flexible and rigid foams over a wide range of densities.

The foam of the invention can be of high density (higher than 80 kg/m$^3$) or of low density (lower than or equal to 80 kg/m$^3$). The density of the foam of the invention can be less than 800 kg/m$^3$, in particular from 10 kg/m$^3$ to 400 kg/m$^3$, or from 20 kg/m$^3$ to 200 kg/m$^3$.

The foam pore sizes are generally lower than 5000 μm, in particular lower than 1000 μm.

Preferably, the foams of the invention have a glass transition temperature from −40° C. to 200° C.

The compression modulus of the foams of the invention can be from 0.005 MPa to 1000 MPa, in particular from 0.02 MPa to 200 MPa. The compression modulus is measured on an instron machine (5566) in compression mode at a rate of 1 mm/min. The slope of the strain/stress curve in the elastic regime is used to calculate the compression modulus.

The NIPU foams according to the present invention can be used in any sector wherein traditional PU foams can be used, for example in the automotive, aeronautic, building, housing, footwear and health sector. Suitable applications include sandwich panels for thermal insulation (building and transportations insulations) and/or acoustic insulation foams for wellness (mattress, furniture, seats, cars), gasket in foam/adhesion joints for sealing (concrete, glass, metals, wood), also joints for car or building windows and for fixing solar cell panels.

The viscous reactive and/or curable formulations of the present invention may be applied onto various substrates (metal, wood, glass, textiles . . . ) using syringes or sprayers. The present formulations may also be used with continuous reactive extrusion-foaming or in reactive injection-molding. The formulation of the present invention may also be sprayable and cured in a second step.

According to another aspect of the present invention, a process for recycling the obtained polyurethane foam is provided by compression molding or extrusion.

The NIPU foams according to the present invention can be easily recycled or repurposed to give them another life. The NIPU foams can be reprocessed by compression molding under thermal treatment or by extrusion (molding). Optionally, a previous grinding step may be performed before such compression molding or extrusion.

The reprocessing temperature of NIPU foams is generally between 100 and 250° C., preferably between 120 and 200° C., and more preferably between 140 and 180° C.

Advantageously, the recycling process, also referred to as reprocessing, is possible without any solvent addition and/or without any metallic reagents.

According to another aspect of the present invention, a recycled polyurethane foam is provided by said recycling process.

Using these processes, the recycled foams subsequently can be processed as films, coatings, adhesives, fibres or as bulk materials by conventional processing techniques well-known by person of the art. Mixtures of NIPU foams of different properties can also be used to produce novel NIPU materials by applying the processing techniques described above. Their properties can be easily modulated by the nature of the NIPU foams that are mixed and by their content/composition.

The invention is illustrated by but not limited to the following examples.

EXAMPLES

A comparison study of several catalysts was first performed for the aminolysis reactions of propylene carbonate (compound E) (leaving urethane products, example 1) and for the decarboxylation by dithiols (compound C) (leaving thioether products, examples 2 and 3).

Example 1: Aminolysis of Propylene Carbonate (Compound E) with 2,2'-(ethylenedioxy)-bis-ethyl-amine (Compound B) Driven by Selected Catalysts (Compound D)

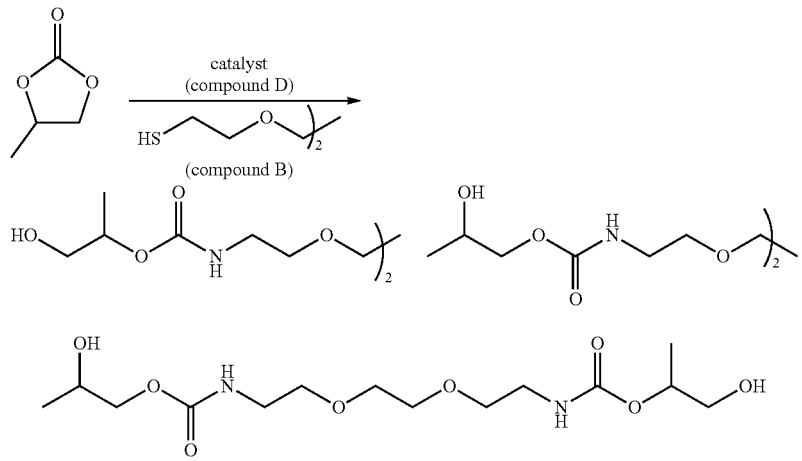

Propylene carbonate (compound E, 1 eq) and a diamine (2,2'-(ethylenedioxy)-bis-ethylamine, compound B, 0.5 eq) were mixed at 80° C. with 5 mol % of catalyst (compound D) under constant agitation of 300 rpm. To monitor the kinetics, samples were picked out every 5 minutes. The reaction was quenched by adding 1 drop of acetic acid before dilution in 800 µl of CDCl$_3$ (0.03% of TMS standard) for further $^1$H NMR analysis (see FIG. 1). The aminolysis of propylene carbonate (Compound E) leads to the formation of hydroxyurethanes with 3 regioisomeric structures as depicted above. The time evolution of the propylene carbonate (compound E) conversion into hydroxyurethane is depicted in FIG. 2 for selected catalysts (compounds D) and found to be more than 80% in 5 to 120 minutes with DBU (1,8-diazabicyclo[5.4.0]undec-7-ene), DBN (1,5-diazabicy-clo[4.3.0]non-5-ene), DABCO (1,4-diazabicyclo[2.2.2]octane) and DMAP (dimethylaminopyridine) while being of about 40% in 120 minutes with MTBD (7-methyl-1,5,7-triazabicyclo[4.4.0]dec-5-ene).

Example 2: Decarboxylation by Dithiol (Compound C) of Propylene Carbonate (Compound E) with Different Organocatalysts

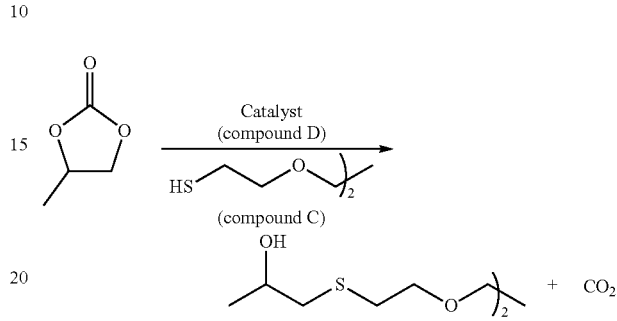

Propylene carbonate (compound E, 1 eq.) and a dithiol (2,2'-(ethylenedioxy)diethanethiol, compound C, 0.5 eq) were mixed at 80° C. with 5 mol % of catalyst (compound D) under constant agitation of 300 rpm. The reaction kinetics were monitored by picking out samples every 10 minutes. The aliquots were quenched by adding one drop of acetic acid before dilution in 800 µl of CDCl$_3$ (0.03% of TMS standard) for further $^1$H NMR analysis. The time evolution of the propylene carbonate (compound E) conversion into thioether moieties was monitored by $^1$H NMR spectroscopy (FIG. 3). The propylene carbonate (compound E) conversion was found to be more than 90% in 60 to 120 minutes with MTBD, TBD (triazabicyclodecene), DBU and DBN while being of about 40% in 120 minutes with DMAP or DABCO (FIG. 4).

FIG. 5 shows how, by an appropriate choice of the catalyst (compound D), both the aminolysis of propylene carbonate (compound E) and the decarboxylative alkylation of dithiols (compound C) can be adjusted to further control the simultaneous NIPU chains growth and the matrix foaming.

Example 3: DBU (Compound D) Driven Decarboxylative Alkylation of Dithiol (Compound C) with Propylene Carbonate (Compound E) at Various Temperatures Propylene carbonate (compound E, 1 eq.) and a dithiol (2,2'-(ethylenedioxy)diethanethiol, compound C, 0.5 eq) were mixed at 60° C., 80° C. or 100° C. with 5 mol % of DBU (compound D) at constant agitation of 300 rpm. The reaction kinetic was monitored by picking out samples every 10 minutes that were quenched by adding one drop of acetic acid before dilution in 800 µl of $CDCl_3$ (0.03% of TMS standard) for further $^1H$ NMR analysis. The time evolution of the propylene carbonate (compound E) conversion into thioether moieties was monitored by $^1H$ NMR spectroscopy and found to be more than 90% in 20, 60 or more than 120 minutes respectively at 100° C., 80° C. or 60° C. (FIG. 6). The decarboxylation rate can therefore be controlled by the temperature.

In the following examples foams were produced using the following compounds:

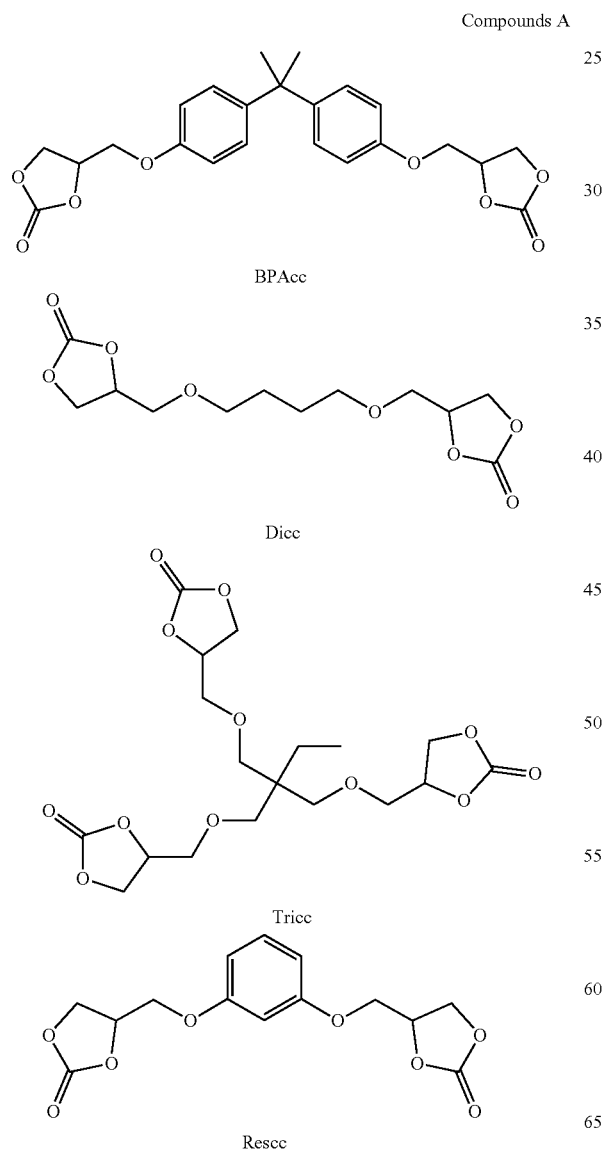

Compounds A

BPAcc

Dicc

Tricc

Rescc

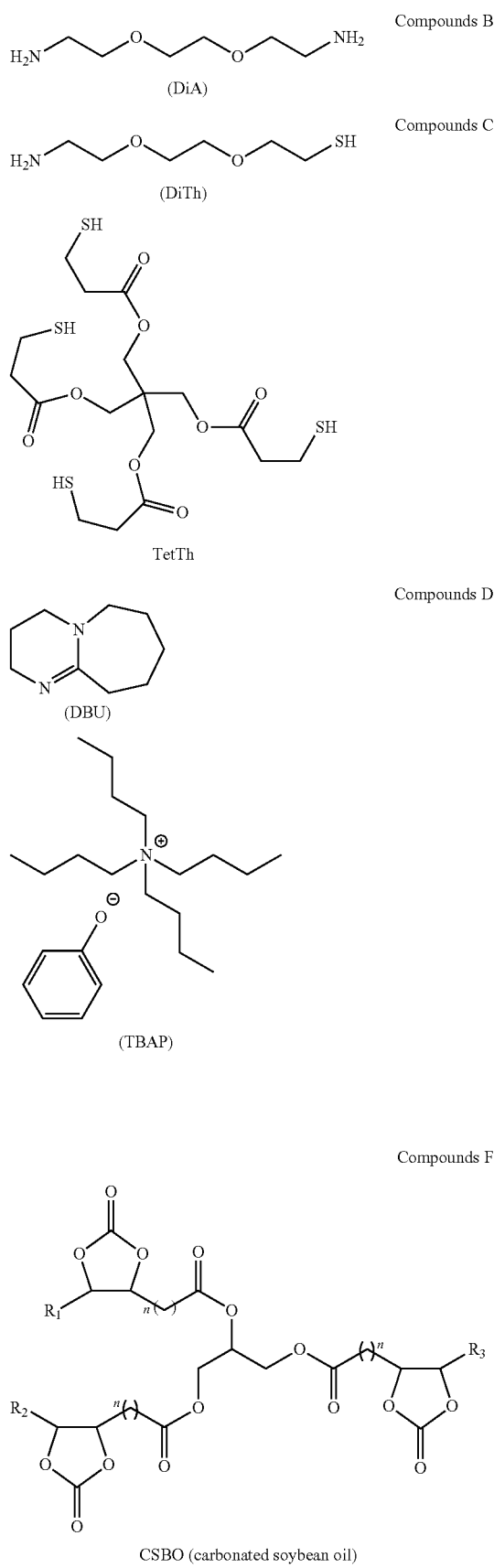

Compounds B (DiA)

Compounds C (DiTh)

TetTh

Compounds D (DBU)

(TBAP)

Compounds F

CSBO (carbonated soybean oil)

-continued

Compounds H

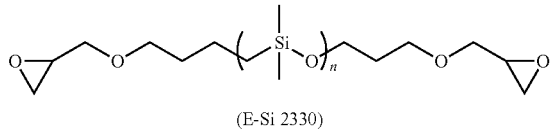

(E-Si 2330)

Example 4

A mixture of compounds A (BPAcc and Dicc) was first prepared in dichloromethane before removal of the solvent. Then, the mixture was added to another compound A (Tricc) in a polypropylene container with Teflon liner and heated at 100° C. until the mixture was completely molten (5-10 min). Compounds B (2,2'-(ethylenedioxy)-bis-ethylamine, DiA), a blend of 2 compounds C (2,2'-(ethylenedioxy)diethanethiol (DiTh) and pentaerythritol tetrathioglycolate (TetTh)) and compound D (DBU) were then added at 80° C. and the mixture was mechanically stirred until a homogeneous viscous mixture was obtained (1 to 2 minutes). The mixture was then placed in an oven at 100° C. After 5 min, an additional mixing of the ingredients for 2 min. was done in order to get a perfectly homogeneous mixture. The curing and foaming of the mixture occurred at 100° C. in 16 h. SEM characterization is presented in FIG. 7.

| Compound | Structure | Content | Weight % |
|---|---|---|---|
| A | Dicc | 0.5141 g | 14.8 |
| A | BPAcc | 0.7596 g | 21.8 |
| A | Tricc | 1.0172 g | 29.2 |
| B | DiA | 0.93 mL | 26.9 |
| C | DiTh | 0.057 mL | 1.8 |
| C | Teth | 0.135 mL | 2.5 |
| D | DBU | 0.105 mL | 3 |

Density: approx. 315 Kg/m³
Glass transition temperature (Tg) determined by differential scanning calorimetry (DSC): Tg (first cycle): −8° C., Tg (second cycle): 7.5° C.
Thermal decomposition at 5 wt % decomposition (Td5%) determined by thermogravimetric analysis (TGA): Td5%: 225° C.

Example 5

Compound A (Tricc, 1 eq), compound B (DiA), compound C (DiTh), compound D (DBU) and compound H (E-SI 2330) were added in a polypropylene container with Teflon liner at room temperature and the mixture was stirred manually until it became homogeneous (after 1-2 min). The container was then heated at 100° C. in an oven for 16 h to yield a flexible foam. SEM images are in FIG. 8.

| Compound | Structure | Content | Weight % |
|---|---|---|---|
| A | Tricc | 1 g | 62.4 |
| B | DiA | 0.3798 mL | 23.9 |
| C | DiTh | 0.1407 mL | 9.8 |
| D | DBU | 0.052 mL | 3.3 |
| H | E-SI 2330 | 0.01 mL | 0.6 |

Density: approx. 260 Kg/m³
Tg (first cycle): −13.9° C.; Tg (second cycle): 7.2° C.
Td5%: 220° C.

Example 6

A mixture of compounds A (Tricc), compound F (cyclocarbonated soybean oil; CSBOcc), compound B (DiA), compound C (DiTh) and compound D (DBU) were added in a polypropylene container with Teflon liner at room temperature and the mixture was stirred manually until it became homogeneous (after 1-2 min). The container was then heated at 100° C. in an oven for 16 h to yield a flexible foam.

| Compound | Structure | Content | Weight % |
|---|---|---|---|
| A | Tricc | 1 g | 59.5 |
| F | CSBOcc | 0.0581 g | 3.5 |
| B | DiA | 0.3986 mL | 23.9 |
| C | DiTh | 0.1476 mL | 9.8 |
| D | DBU | 0.054 mL | 3.3 |

Density: approx. 260 Kg/m³
SEM characterization: see FIG. 9

Example 7

Compounds A (Rescc and Tricc) were weighted in a polypropylene container with Teflon liner and heated at 100° C. until the mixture was fully molten (5-10 min). Compound B (DiA), compound C (DiTh) and compound D (DBU) were then added at 80° C. and the mixture was mechanically stirred until a homogeneous viscous mixture was obtained (1 to 2 minutes). The mixture was then placed in an oven at 100° C. After 5 min, an additional mixing of the ingredients for 2 min. was realized in order to get a perfectly homogeneous mixture. The curing and foaming of the mixture occurred at 100° C. in 16 h.

| Compound | Structure | Content | Weight % |
|---|---|---|---|
| A | Tricc | 1 g | 52.7 |
| A | Rescc | 0.1786 g | 9.4 |
| B | DiA | 0.3903 mL | 20.8 |
| C | DiTh | 0.2336 mL | 13.8 |
| D | DBU | 0.061 mL | 3.3 |

Density: approx. 197 Kg/m³

Example 8

Compound A (Tricc, 1 eq), compound B (DiA), compound C (DiTh), compound D (DBU), compound H (E-SI 2330) and a clay (Laponite S482) were weighted in a polypropylene container with Teflon liner at room temperature and the mixture was stirred manually until it became homogeneous (after 1-2 min). The mixture was then heated at 100° C. in an oven for 16 h to yield a foam.

| Compound | Structure | Content | Weight % |
|---|---|---|---|
| A | Tricc | 1 g | 61.2 |
| B | DiA | 0.3798 mL | 23.5 |
| C | DiTh | 0.1407 mL | 9.6 |
| D | DBU | 0.052 mL | 3.2 |
| H | E-SI 2330 | 0.01 mL | 0.6 |
| Clay | Laponite S482 | 0.0314 g | 1.9 |

Density: approx. 289 Kg/m³
SEM characterization: see FIG. 10

Example 9

Compound A (Tricc, 1 eq), compound B (DiA), compound C (DiTh), compound D (TBAP) and compound H (E-SI 2330) were weighed in a polypropylene container with Teflon liner at room temperature and the mixture was stirred manually until it became homogeneous (after 1-2 min). The mixture was then heated at 100° C. in an oven for 16 h to yield a foam. SEM images are in FIG. 11.

| Compound | Structure | Content | Weight % |
|---|---|---|---|
| A | Tricc | 1 g | 60 |
| B | DiA | 0.3798 mL | 23 |
| C | DiTh | 0.1407 mL | 9.4 |
| D | TBAP | 0.116 g | 7 |
| H | E-SI 2330 | 0.01 mL | 0.6 |

Density approx: 260 Kg/m³

Example 10

Compound A (Rescc) was weighted in a polypropylene container with Teflon liner and heated at 100° C. until the compound was fully molten (5-10 min). Compound B (TriA), compounds C (DiTh, TetTh) and compound D (DBU) were then added and the mixture was mechanically stirred until a homogeneous viscous mixture was obtained (1 to 2 minutes). The mixture was then placed in an oven at 100° C. After 5 min, an additional mixing of the ingredients for 2 min was realized in order to get a perfectly homogeneous mixture. The curing and foaming of the mixture occurred at 100° C. in 6 h. SEM images are in FIG. 12.

| Compound | Structure | Content | Weight % |
|---|---|---|---|
| A | Rescc | 0.8 g | 70.6 |
| B | TriA | 0.219 mL | 18.9 |
| C | DiTh | 0.042 mL | 4.2 |
| C | TetTh | 0.025 mL | 2.8 |
| D | DBU | 0.039 mL | 3.5 |

Density approx: 78 Kg/m³

Example 11

Self-blowing foams were prepared from the following monomers: Tricc as compound A, DiA as compound B and DiTh as compound C. Various comonomer molar ratios A/B/C were tested, as listed in the table below. In some cases, additives were added: either clay Laponite S482 (1.5 wt %) or a polydimethylsiloxane (PDMS, 0.01 eq compared to Tricc) namely E-Si2330 listed as compound H. After homogenization of the mixture under solvent-free conditions with the catalyst DBU (5 mol % compared to compound A) at room temperature for 2 min, the formulation was poured in a silicone mold and pre-cured at 25° C. for 16 h. By curing the formulation for 2 h at 100° C. followed by a temperature increase to 120° C. in 30 min and an additional 1 h post-curing treatment at 120° C., a tacky-free foam was collected. The solid density was estimated to be 0.98+/−0.02 g/cm³ on non-foamed samples. The densities of the obtained foams were measured and are listed in the table below. The pore size and densities were evaluated by SEM characterization. The $A_h/A_c$ ratio represents the open-to-close cell ratios, $A_h$ being the cell-faces holes area and $A_c$ the cell-faces area measured from SEM images. To evaluate the cell density, the number of cell is measured using following formula: $(nM/A)3/2 \rho s/\rho p$ with n=the number of cells in the SEM image (average value on 6 SEM images), M the magnification, A the surface area of the image (mm²) and ρs and ρp the solid and the foamed sample densities.

| Entry | Formulation A/B/C | Additives | Foam Density g/cm³ | Pore size (mm) | Ah/Ac | Cell density (cells/cm³) |
|---|---|---|---|---|---|---|
| 1 | 1/1.125/0.375 | None | 0.166 +/− 0.007 | 0.98 +/− 0.35 | 17.2 | 1,620 +/− 110 |
| 2 | 1/1.125/0.375 | Clay | 0.207 +/− 0.011 | 0.62 +/− 0.23 | 23.7 | 4,570 +/− 50 |
| 3 | 1/1.1325/0.3775 | PDMS | 0.196 +/− 0.005 | 0.87 +/− 0.23 | 9.7 | 2,280 +/− 310 |
| 4 | 1/1.1325/0.3775 | Clay + PDMS | 0.180 +/− 0.005 | 0.60 +/− 0.21 | 11.5 | 5,070 +/− 240 |

The thermo-mechanical properties of the obtained foams are listed in the table below. The thermal degradation of the foams was evaluated by TGA and DSC. The mechanical properties were tested by Dynamic mechanical analysis (DMA). The stress is measured at a 50% of strain. The recovery time is measured for a 99% of shape recovery. After the third compression, all samples recovered over 99% of their initial shape in less than 30 s, qualifying these materials as flexible.

| Entry | Formulation A/B/C | $T_{d5\%}$ (° C.) | $T_g$ (° C.) | Stress [c] (kPa) | Recovery Time [d] (s) |
|---|---|---|---|---|---|
| 1 | 1/1.125/0.375 | 248 | 3.6 | 8.2 +/− 0.2 | 30 +/− 2 |
| 2 | 1/1.125/0.375 | 246 | 7.9 | 11.4 +/− 0.7 | 17 +/− 0.5 |
| 3 | 1/1.1325/0.3775 | 247 | 3 | 11.2 +/− 0.9 | 10 +/− 0.2 |
| 4 | 1/1.1325/0.3775 | 244 | 2.4 | 8.7 +/− 0.5 | 8.4 +/− 0.1 |

Example 12

A foam as obtained in one of previous examples was reprocessed by compression molding as follows: a foam slice about 0.5 cm thick (about 2 g) was placed between Teflon sheets and pressed for 2 h at 160° C. under a 1 tonne force. 3 cycles of applying-releasing the pressure were performed in the beginning to allow volatiles draining in order to give well-formed, cracks-free and homogeneous NIPU film.

The invention claimed is:

1. A curable isocyanate-free formulation for preparing a polyurethane self-blowing foam comprising at least one multifunctional cyclic carbonate having at least two cyclic carbonate groups at the end of the chain (compound A), at least one multifunctional amine (compound B), at least one multifunctional thiol (compound C) and at least one catalyst (compound D).

2. The formulation according to claim 1 wherein compound A corresponds to formula I

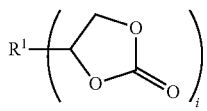

Formula (I)

wherein
i is an integer higher than or equal to 2,
R1 is a carbon bond between the cyclic carbonate rings or is a linear or branched hydrocarbon chain, which may be unsubstituted or substituted and wherein one or several hydrocarbon groups of said hydrocarbon chain may be replaced by an heteroatom, a ketone, a cycloalkyl, an heterocycle, an aryl or an heteroaryl, each of which may be unsubstituted or substituted, said hydrocarbon chain having at least 2 carbon atoms.

3. The formulation according to claim 1 wherein compound B corresponds to formula II

Formula (II)

wherein
j is an integer higher than or equal to 2,
R2 is an aryl or heteroaryl, each of which may be unsubstituted or substituted, or a linear or branched hydrocarbon chain, which may be unsubstituted or substituted, and wherein one or several hydrocarbon groups of said hydrocarbon chain may be replaced by a heteroatom, a cycloalkyl or an heterocycle, each of which may be unsubstituted or substituted, said hydrocarbon chain having at least 2 carbon atoms, and
wherein R' each independently may be hydrogen, an alkyl or a cycloalkyl.

4. The formulation according to claim 1 wherein compound C corresponds to formula III

Formula III wherein
k is an integer higher than or equal to 2,
R3 is a linear or branched hydrocarbon chain, which may be unsubstituted or substituted, and wherein one or several hydrocarbon groups of said hydrocarbon chain may be replaced by an heteroatom, a ketone, a cycloalkyl or an heterocycle, each of which may be unsubstituted or substituted, said hydrocarbon chain having at least 2 carbon atoms, or R3 is a linear or branched polymeric group.

5. The formulation according to claim 1 wherein compound D is selected from the group consisting of an amine catalyst, an ionic salt or ionic liquid composed of a combination of a cation and an anion, organometallic catalyst and a phosphine-based catalyst.

6. The formulation according to claim 1 wherein compound A is present in an amount of from 18 to 80 wt %, the percentage being expressed relative to the total weight of the formulation.

7. The formulation according to claim 1 wherein compound B is present in an amount of from 10 to 80 wt %, the percentage being expressed relative to the total weight of the formulation.

8. The formulation according to claim 1 wherein compound C is present in an amount of from 1 to 60 wt %, the percentage being expressed relative to the total weight of the formulation.

9. The formulation according to claim 1 wherein compound D is present in an amount of from 0.1 to 15 wt %, the percentage being expressed relative to the total weight of the formulation.

10. The formulation according to claim 1 further comprising a monofunctional cyclic carbonate (compound E).

11. The formulation according to claim 1 further comprising a multifunctional cyclic carbonate having at least two cyclic carbonate groups within the chain (compound F), in an amount of from 1 to 50 wt %, the percentage being expressed relative to the total weight of the formulation.

12. The formulation according to claim 1 further comprising a monofunctional thiol (compound G).

13. The formulation according to claim 1 further comprising a polyepoxide (compound H), in an amount of from 0.1 to 50 wt %, the percentage being expressed relative to the total weight of the formulation.

14. Process for preparing a polyurethane self-blowing foam comprising the steps of providing a formulation as defined in claim 1 and curing said formulation at a temperature between 25° C. and 200° C. so as to promote the formation of $CO_2$ and form a non-isocyanate polyurethane foam.

15. Process for preparing a polyurethane foam comprising the steps of
(i) mixing compounds A and B in the presence of compound D so as to form a viscous mixture,
(ii) partially curing said mixture so as to form a non-isocyanate polyurethane viscous prepolymer,
(iii) adding compound C to said prepolymer,
(iv) curing said mixture obtained in step (iii) so as to form a non-isocyanate polyurethane foam, wherein compounds A, B, C, and D are as defined in any one of claim 1.

16. Process for preparing a polyurethane foam comprising the steps of
(i) mixing compounds A and B in the presence of compound C so as to form a viscous mixture,
(ii) partially curing said mixture so as to form a non-isocyanate polyurethane viscous prepolymer loaded with unreacted compound C,
(iii) adding compound D to said prepolymer,
(iv) curing said mixture obtained in step (iii) so as to promote the formation of $CO_2$ and form a non-isocyanate polyurethane foam,
wherein compounds A, B, C, and D are as defined in claim 1.

17. The formulation according to claim 2 wherein i is an integer from 2 to 10.

18. The formulation according to claim 2 wherein said hydrocarbon chain has from 3 to 60 carbon atoms.

19. The formulation according to claim 3 wherein j is an integer from 2 to 6.

20. The formulation according to claim 3 wherein said hydrocarbon chain has from 2 to 60 carbon atoms.

21. The formulation according to claim 4 wherein k is an integer from 2 to 6.

22. The formulation according to claim 4 wherein said hydrocarbon chain has from 2 to 60 carbon atoms.

23. The formulation according to claim 5 wherein compound D is 1,8-diazabicyclo[5.4.0]undec-7-ene or tetrabutylammonium phenolate.

24. The formulation according to claim 10 wherein a monofunctional cyclic carbonate (compound E) is in an amount from 1 to 50 wt %, the percentage being expressed relative to the total weight of the formulation, and said monofunctional cyclic carbonate is of formula IV

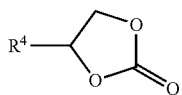

Formula (IV)

wherein
R4 is hydrogen or a linear or branched hydrocarbon chain, which may be unsubstituted or substituted with a functional group selected from the group consisting of an alcohol, a secondary or tertiary amine, a carboxylic acid, an alkene, and an ester, and wherein one or several hydrocarbon groups of said hydrocarbon chain may be replaced by an heteroatom, a cycloalkyl or an heterocycle, each of which may be unsubstituted or substituted, said hydrocarbon chain having at least 1 carbon atom.

25. The formulation according to claim 12 wherein the monofunctional thiol (compound G) is present in an amount from 1 to 50 wt %, the percentage being expressed relative to the total weight of the formulation, and said monofunctional thiol corresponding to formula VIII R17-SH        Formula (VIII)

wherein:
R17 is an aryl group which may be unsubstituted or substituted or a linear of branched polymeric group or a linear or branched hydrocarbon chain which may be unsubstituted or substituted with a functional group selected from the group consisting of alcohol, primary, secondary or tertiary amine, carboxylic acid, and ester, and wherein one or several hydrocarbon groups of said hydrocarbon chain may be replaced with a heteroatom, a ketone, a cycloalkyl or an heterocycle, each of which may be unsubstituted or substituted, said hydrocarbon chain having at least 2 carbon atoms.

* * * * *